United States Patent
Mitobe et al.

(10) Patent No.: US 12,235,479 B2
(45) Date of Patent: Feb. 25, 2025

(54) LIGHT ABSORPTION ANISOTROPIC FILM, OPTICAL FILM, AND IMAGE DISPLAY DEVICE

(71) Applicant: FUJIFILM Corporation, Tokyo (JP)

(72) Inventors: Fumitake Mitobe, Kanagawa (JP); Shinya Watanabe, Kanagawa (JP); Naoya Nishimura, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 0 days.

(21) Appl. No.: 18/540,153

(22) Filed: Dec. 14, 2023

(65) Prior Publication Data

US 2024/0151888 A1   May 9, 2024

Related U.S. Application Data

(63) Continuation of application No. PCT/JP2022/024338, filed on Jun. 17, 2022.

(30) Foreign Application Priority Data

Jun. 28, 2021  (JP) .................................. 2021-106817
Sep. 15, 2021  (JP) .................................. 2021-150400

(51) Int. Cl.
  *G02B 5/30*  (2006.01)
  *G02B 1/08*  (2006.01)

(52) U.S. Cl.
  CPC ............. *G02B 5/3016* (2013.01); *G02B 1/08* (2013.01); *G02F 2202/043* (2013.01)

(58) Field of Classification Search
  CPC .... G02B 5/3016; G02B 1/08; G02F 2202/043
  See application file for complete search history.

(56) References Cited

U.S. PATENT DOCUMENTS

| 2009/0153783 | A1  | 6/2009  | Umemoto |
| 2015/0041051 | A1* | 2/2015  | Kobayashi ........... G02B 5/3016 |
|              |     |         | 349/194 |
| 2016/0334633 | A1* | 11/2016 | Asanoi ...................... E06B 9/24 |

FOREIGN PATENT DOCUMENTS

| JP | 2009-145776 A | 7/2009 |
| JP | 2018-022153 A | 2/2018 |

(Continued)

OTHER PUBLICATIONS

International Search Report issued in PCT/JP2022/024338 on Aug. 9, 2022.

(Continued)

*Primary Examiner* — Paisley L Wilson
(74) *Attorney, Agent, or Firm* — Edwards Neils LLC; Jean C. Edwards, Esq.

(57) ABSTRACT

A light absorption anisotropic film that, in a case of being applied to an image display device, it is possible to suppress redness of an image originating from the image display device, which is reflected on surrounding members arranged around the image display device; and an optical film and an image display device. The light absorption anisotropic film is formed of a composition containing a liquid crystal compound and a dichroic substance, in which the light absorption anisotropic film has two main surfaces facing each other, an angle between a normal direction of the main surface of the light absorption anisotropic film and a transmittance central axis of the light absorption anisotropic film is 0° to 45°, and predetermined requirements are satisfied depending on the angle.

20 Claims, 4 Drawing Sheets

(56) References Cited

FOREIGN PATENT DOCUMENTS

JP  2020-122854 A  8/2020
WO  2010/101141 A1  9/2010

OTHER PUBLICATIONS

Written Opinion issued in PCT/JP2022/024338 on Aug. 9, 2022.
International Preliminary Report on Patentability completed by WIPO on Dec. 14, 2023 in connection with International Patent Application No. PCT/JP2022/024338.

* cited by examiner

LIGHT ABSORPTION ANISOTROPIC FILM, OPTICAL FILM, AND IMAGE DISPLAY DEVICE

CROSS-REFERENCE TO RELATED APPLICATIONS

This application is a Continuation of PCT International Application No. PCT/JP2022/024338 filed on Jun. 17, 2022, which was published under PCT Article 21(2) in Japanese, and which claims priority under 35 U.S.C. § 119(a) to Japanese Patent Application No. 2021-106817, filed on Jun. 28, 2021, and Japanese Patent Application No. 2021-150400, filed on Sep. 15, 2021. The above applications are hereby expressly incorporated by reference, in their entirety, into the present application.

BACKGROUND OF THE INVENTION

1. Field of the Invention

The present invention relates to a light absorption anisotropic film, an optical film, and an image display device.

2. Description of the Related Art

An image display device has been used in various scenes, and it may be required to control a viewing angle such as reflected glare of an image depending on applications of the image display device. For example, in a case where an in-vehicle display such as a car navigation system is used, light emitted from a display screen may be reflected on a windshield or window glass.

In JP2009-145776A, it is disclosed that, by using a light absorption anisotropic film containing a dichroic substance, in which an absorption axis is tilted by 0° to 45° with respect to a normal direction of the film, it is possible to control a viewing angle in an image display device.

SUMMARY OF THE INVENTION

In a case where the light absorption anisotropic film disclosed in JP2009-145776A is applied to an image display device and its characteristics are evaluated, the present inventors have confirmed that, for example, in a case where the image display device is used in a car navigation system or the like, the image may be reflected on surrounding members such as the windshield and the window glass, and the reflected image may have a reddish tinge. The reddish image is visually conspicuous to an observer.

Therefore, in a case where the image is reflected on the surrounding member of the image display device, it is desired to suppress redness of the image.

An object of the present invention is to provide a light absorption anisotropic film that, in a case of being applied to an image display device, it is possible to suppress redness of an image originating from the image display device, which is reflected on surrounding members arranged around the image display device.

Another object of the present invention is to provide an optical film and an image display device.

The present inventors have found that the above-described objects can be achieved by the following configurations.

(1) A light absorption anisotropic film formed of a composition containing a liquid crystal compound and a dichroic substance,
in which the light absorption anisotropic film has two main surfaces facing each other,
an angle between a normal direction of the main surface of the light absorption anisotropic film and a transmittance central axis of the light absorption anisotropic film is 0° to 45°,
in a case where the angle is 0°, a requirement A1 described later is satisfied, and
in a case where the angle is other than 0°, a requirement B1 described later is satisfied.

(2) The light absorption anisotropic film according to (1),
in which, in a case where the angle is 0°, a requirement A2 described later is satisfied, and
in a case where the angle is other than 0°, a requirement B2 described later is satisfied.

(3) The light absorption anisotropic film according to (1) or (2),
in which, in a case where the angle is 0°, a requirement A3 described later is satisfied, and
in a case where the angle is other than 0°, a requirement B3 described later is satisfied.

(4) The light absorption anisotropic film according to any one of (1) to (3),
in which, in a case where the angle is 0°, a requirement A4 described later is satisfied, and
in a case where the angle is other than 0°, a requirement B4 described later is satisfied.

(5) The light absorption anisotropic film according to any one of (1) to (4),
in which a content of the dichroic substance is 30% by mass or more with respect to a total content of the liquid crystal compound and the dichroic substance.

(6) An optical film comprising:
the light absorption anisotropic film according to any one of (1) to (5); and
a C-plate.

(7) An optical film comprising:
the light absorption anisotropic film according to any one of (1) to (5); and a B-plate.

(8) An image display device comprising:
the light absorption anisotropic film according to any one of (1) to (5); or
the optical film according to (6) or (7).

According to the present invention, it is possible to provide a light absorption anisotropic film that, in a case of being applied to an image display device, it is possible to suppress redness of an image originating from the image display device, which is reflected on surrounding members arranged around the image display device.

In addition, according to the present invention, it is possible to provide an optical film and an image display device.

DESCRIPTION OF THE PREFERRED EMBODIMENTS

Figure 1:
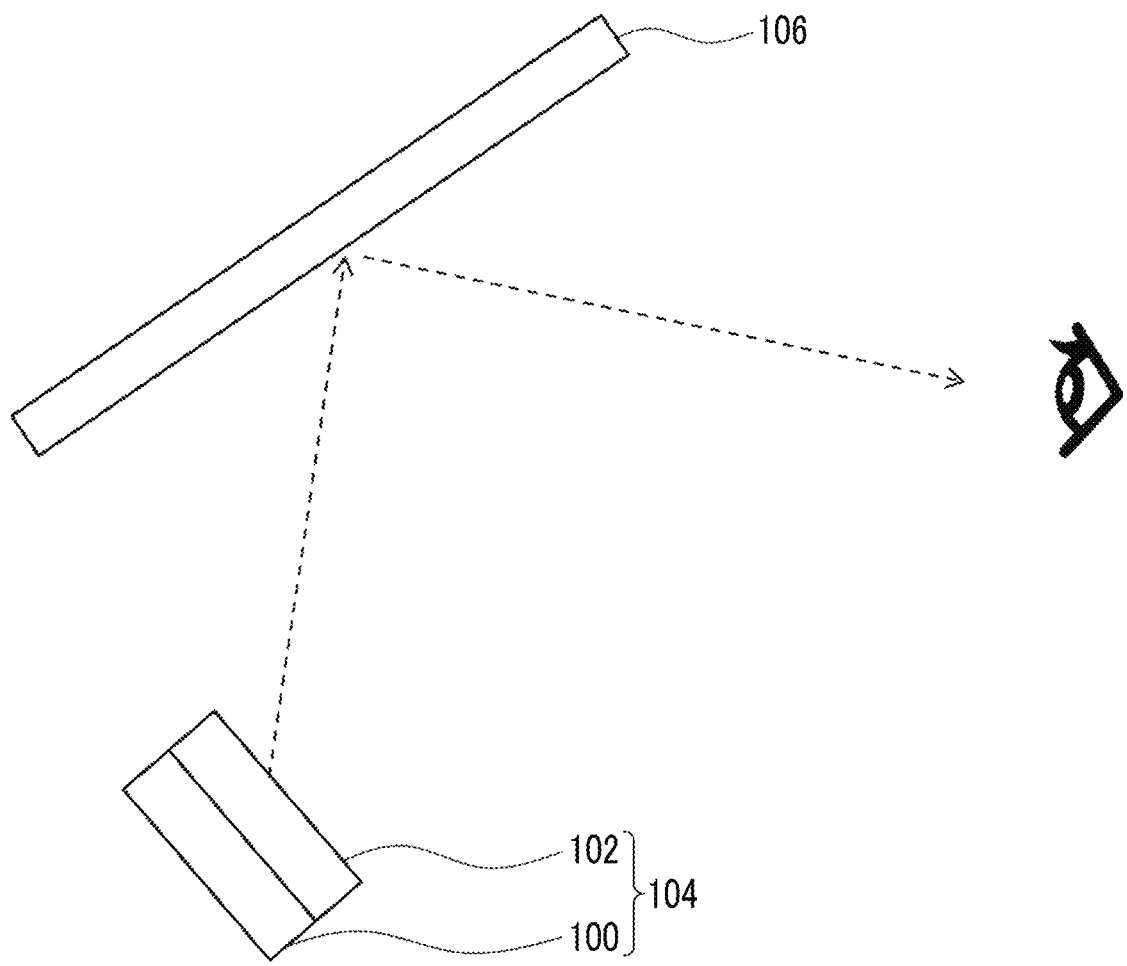
FIG. 1 is a diagram for describing an aspect in which an image originating from an image display device including the light absorption anisotropic film according to the embodiment of the present invention is reflected on a windshield.

Hereinafter, the present invention will be described in detail.

The description of configuration requirements described below may be made based on typical embodiments of the present invention, but the present invention is not limited to such embodiments.

Any numerical range expressed using "to" in the present specification refers to a range including the numerical values before and after the "to" as a lower limit value and an upper limit value, respectively.

In the present specification, a term "(meth)acrylic" is used to mean "either one or both of acrylic and methacrylic". A term "(meth)acryloyl" is used to mean "either one or both of acryloyl and methacryloyl".

In the present invention, Re($\lambda$) and Rth($\lambda$) represent an in-plane retardation at a wavelength $\lambda$ and a thickness direction retardation at a wavelength $\lambda$, respectively. Unless otherwise specified, the wavelength $\lambda$ is 550 nm.

In the present invention, Re($\lambda$) and Rth($\lambda$) are values measured at the wavelength $\lambda$ in AxoScan OPMF-1 (manufactured by Opto Science, Inc.). By inputting an average refractive index (($n_x+n_y+n_z$)/3) and a film thickness (d (μm)) in AxoScan, Slow axis direction (°)
Re ($\lambda$)=R0 ($\lambda$), and $$Rth(\lambda)=((n_x+n_y)/2-n_z) \times d$$

are calculated.

In addition, R0($\lambda$) is expressed in a numerical value calculated with AxoScan OPMF-1, and means Re($\lambda$).

In the present specification, the refractive indices $n_x$, $n_y$, and $n_z$ are measured using an Abbe refractometer (NAR-4T, manufactured by Atago Co., Ltd.) and using a sodium lamp ($\lambda$=589 nm) as a light source. In addition, in a case of measuring the wavelength dependence, it can be measured with a multi-wavelength Abbe refractometer DR-M2 (manufactured by Atago Co., Ltd.) in combination with a dichroic filter.

In addition, values in Polymer Handbook (John Wiley & Sons, Inc.) and catalogs of various optical films can be used. The values of the average refractive index of main optical films are exemplified below: cellulose acylate (1.48), cycloolefin polymer (1.52), polycarbonate (1.59), polymethylmethacrylate (1.49), and polystyrene (1.59).

A bonding direction of a divalent group (for example, —COO—) described in the present specification is not particularly limited. For example, in a case where L in X-L-Y is —COO— and in a case where the position bonded to the X side is defined as *1 and the position bonded to the Y side is defined as *2, L may be *1—O—CO—*2 or *1—CO—O—*2.

A feature point of the light absorption anisotropic film according to the embodiment of the present invention is that an average polarization degree (average polarization degree A and average polarization degree B) described later is high and a retardation at a wavelength of 650 nm, which is measured in a predetermined direction, is less than a predetermined value.

In the related art, in a case of studying the cause of the redness of an image originating from an image display device, which is reflected on a surrounding member disposed around the image display device in which the light absorption anisotropic film is disposed on the viewing side, the present inventors have found that a polarization state of light emitted from an image display element and passed through the light absorption anisotropic film differs depending on a wavelength.

Hereinafter, a case where the image display device is used as a car navigation system for a vehicle will be described in more detail as an example. As the image display device used in a car navigation system for a vehicle as shown in FIG. 1, in a case of using an image display device 104 including an image display element 100 and a light absorption anisotropic film 102 in the related art, which is disposed on the viewing side, part of light emitted from the image display device 104 traveled toward a windshield 106, and an image is reflected on the windshield 106. Examples of the light related to the reflected glare include light emitted in a direction tilted at a predetermined angle (generally, approximately 50°) with respect to a normal direction of the image display device 104. In the light incident from the image display device 104 including the light absorption anisotropic film 102 in the related art and traveling to the windshield 106, light having a wavelength in a red region (wavelength of 600 to 700 nm) includes a large amount of S-polarized light components. Therefore, in the light incident on the windshield 106, since the S-polarized light in the red region is more visible to the observer, the image reflected on the windshield 106 is more reddish. The above-described problem occurs more remarkably in a case where the light incident from the image display element 100 is P-polarized light.

On the other hand, in the light absorption anisotropic film according to the embodiment of the present invention, the average polarization degree (average polarization degree A or average polarization degree B) described layer is high and the retardation at a wavelength of 650 nm, which is measured in a predetermined direction, is less than a predetermined value. In a case where such a light absorption anisotropic film as described above is used, the amount of S-polarized light components in the red region in the light emitted from the image display device toward the windshield decreases, and as a result, the desired effect can be obtained.

Light Absorption Anisotropic Film

The light absorption anisotropic film according to the embodiment of the present invention is a light absorption anisotropic film formed of a composition containing a liquid crystal compound and a dichroic substance, in which the light absorption anisotropic film has two main surfaces facing each other, an angle between a normal direction of the main surface of the light absorption anisotropic film and a transmittance central axis of the light absorption anisotropic film is 0° to 45°, in a case where the angle is 0°, a requirement A1 described later is satisfied, and in a case where the angle is other than 0°, a requirement B1 described later is satisfied.

Hereinafter, the requirements A1 and B1 will be described separately for the case where the above-described angle is 0° and the case where the above-described angle is other than 0°.

First, the transmittance central axis denotes a direction in which the transmittance is highest in a case where the transmittance is measured by changing an inclination angle (polar angle) and an inclination direction (azimuthal angle) with respect to a normal direction of a main surface of the light absorption anisotropic film. Specifically, Mueller matrix at a wavelength of 550 nm is measured using AxoScan OPMF-1 (manufactured by Opto Science, Inc.). More specifically, in the measurement, the azimuthal angle at which the transmittance central axis is inclined is first searched for, the Mueller matrix at a wavelength of 550 nm is measured while the polar angle which is the angle with respect to the surface of the light absorption anisotropic film in the normal direction is changed from −70° to 70° at intervals of 1° in the surface (the plane which has the transmittance central axis and is orthogonal to the layer surface) having the normal direction of the light absorption anisotropic film along the azimuthal angle thereof, and the transmittance of the light absorption anisotropic film is derived. As a result, the direction at which the highest transmittance is exhibited is defined as the transmittance central axis.

The transmittance central axis denotes a direction of ab absorption axis (major axis direction of a molecule) of the dichroic substance contained in the light absorption anisotropic film.

As a first embodiment of the light absorption anisotropic film an aspect in which the light absorption anisotropic film is formed of a composition containing a liquid crystal compound and a dichroic substance, in which the light absorption anisotropic film has two main surfaces facing each other, and an angle between a normal direction of the main surface of the light absorption anisotropic film and a transmittance central axis of the light absorption anisotropic film is 0°, is mentioned.

Figure 2:
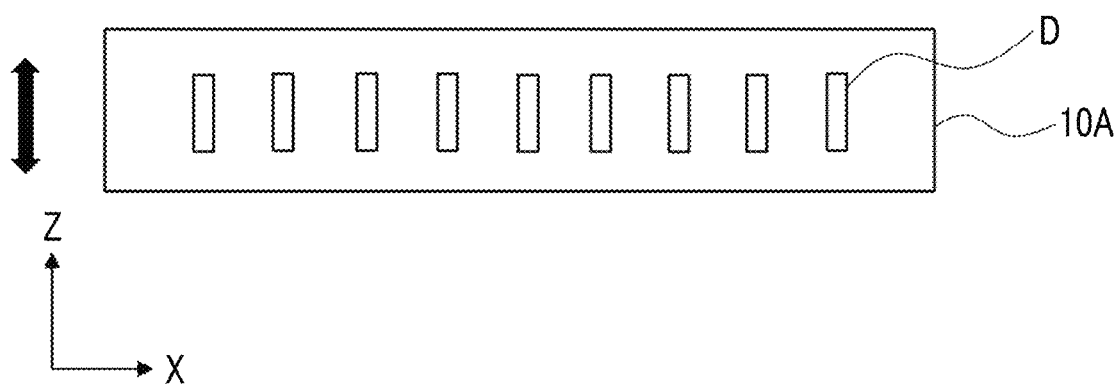
FIG. 2 is a cross-sectional view conceptually showing a first embodiment of the light absorption anisotropic film according to the present invention.
Figure 3:
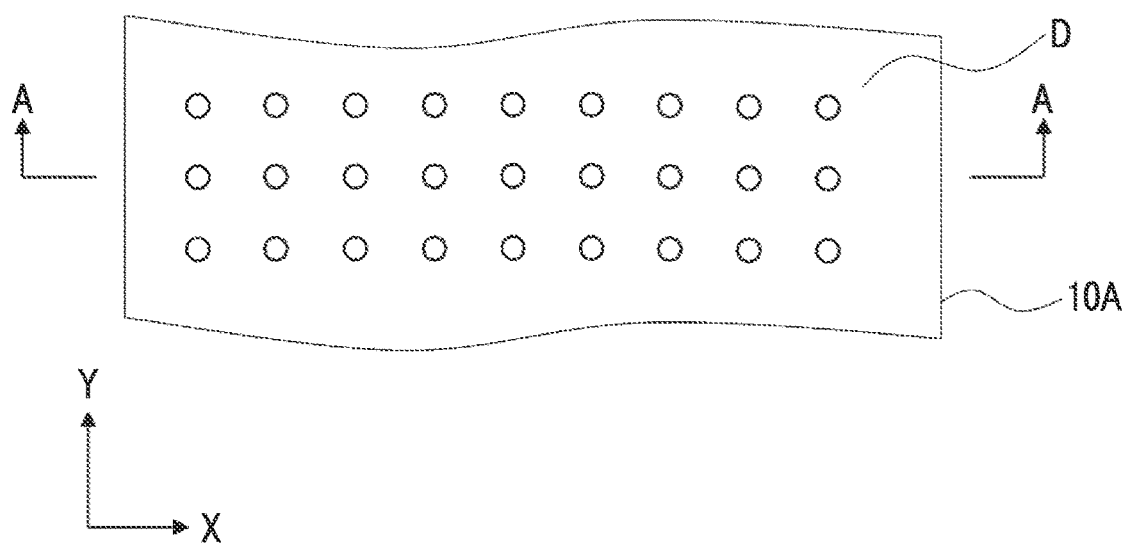
FIG. 3 is a plan view of the first embodiment of the light absorption anisotropic film according to the present invention, shown in FIG. 2.

FIG. 2 is a cross-sectional view showing a light absorption anisotropic film 10A, and FIG. 3 is a plan view showing the light absorption anisotropic film 10A shown in FIG. 2. FIG. 2 is a cross-sectional view taken along line A-A in FIG. 3.

In FIG. 2, a direction X and a direction Z represent orientations of two coordinate axes orthogonal to each other on an observation surface. The direction Z is parallel to a thickness direction of the light absorption anisotropic film 10A.

In FIG. 3, a direction X and a direction Y represent orientations of two coordinate axes orthogonal to each other on an observation surface.

A dichroic substance D is a substance which causes a difference in absorption intensity in a case where two linearly polarized light having different directions of electric vectors of light by 90° are irradiated as described later.

In addition, the two main surfaces denote a pair of surfaces having the largest area in the light absorption anisotropic film.

In the light absorption anisotropic film 10A, the dichroic substances D are arranged such that an angle between a major axis direction of the dichroic substance D and a normal direction of the main surface of the light absorption anisotropic film 10A is 0°. Therefore, in the light absorption anisotropic film 10A, a transmittance central axis corresponds to a direction indicated by the black arrow in FIG. 2, and an angle between the normal direction of the main surface of the light absorption anisotropic film 10A and the transmittance central axis is 0°.

The transmittance central axis of the light absorption anisotropic film 10A corresponds to the direction in which the dichroic substances D are arranged. In other words, the transmittance central axis of the light absorption anisotropic film 10A also corresponds to a direction in which the major axis direction of the dichroic substance D is aligned.

Therefore, the transmittance central axis of the light absorption anisotropic film 10A can also be referred to as an absorption axis of the light absorption anisotropic film 10A.

The light absorption anisotropic film 10A satisfies the following requirement A1.

Requirement A1: an average polarization degree A of a polarization degree which is measured by allowing light having a wavelength of 450 nm to be incident from a direction tilted by 50° with respect to the normal direction of the main surface of the light absorption anisotropic film 10A, a polarization degree which is measured by allowing light having a wavelength of 550 nm to be incident from the direction tilted by 50° with respect to the normal direction, and a polarization degree which is measured by allowing light having a wavelength of 650 nm to be incident from the direction tilted by 50° with respect to the normal direction is 0.80 or more, and a retardation at a wavelength of 650 nm in the direction tilted by 50° with respect to the normal direction is less than 250 nm.

Figure 4:
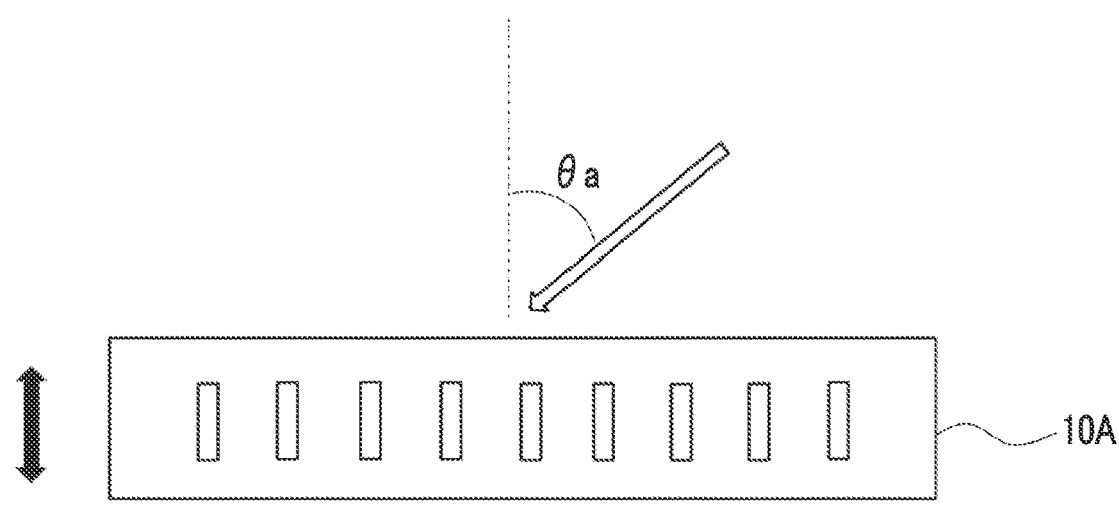
FIG. 4 is a diagram for describing an aspect in which light is incident from a direction tilted by 50° with respect to a normal direction of a main surface of the light absorption anisotropic film according to the embodiment of the present invention.

The above-described requirement A1 will be described with reference to FIG. 4. FIG. 4 is a cross-sectional view of the light absorption anisotropic film 10A, and as described above, in the light absorption anisotropic film 10A, the angle between the major axis direction of the dichroic substance D and the normal direction of the main surface of the light absorption anisotropic film 10A is 0°, and the angle between the normal direction of the main surface of the light absorption anisotropic film 10A and the transmittance central axis (black arrow) is 0°.

In the above-described requirement A1, as shown in FIG. 4, a polarization degree is measured by allowing light having a wavelength of 450 nm to be incident from a direction (white arrow in FIG. 4) inclined by 50° with respect to the normal direction of the main surface of the light absorption anisotropic film 10A (in other words, the transmittance central axis of the light absorption anisotropic film 10A). That is, the light having a wavelength of 450 nm is incident from a direction in which an angle θa between the normal direction in FIG. 4 and the incident direction of light is 50°, and the polarization degree is measured.

The polarization degree is measured using AxoScan OPMF-1 (manufactured by Opto Science, Inc.).

The above-described polarization degree is a value represented by the following expression, and the maximum value thereof is 1.00. In the expression, $Ty0$ is a transmittance with respect to polarized light in a direction orthogonal to a direction obtained by orthographically projecting the transmittance central axis onto a plane orthogonal to the direction in which the light is incident, and Tz0 is a transmittance with respect to polarized light in a direction parallel to the direction obtained by orthographically projecting the transmittance central axis onto the plane orthogonal to the direction in which the light is incident.

$$\text{Polarization degree} = \sqrt{\frac{(TyO - TZ0)}{(TyO + Tz0)}} \quad \text{[Expression 1]}$$

In addition, the polarization degree is measured with light having a wavelength of 550 nm instead of the light having a wavelength of 450 nm. Furthermore, the polarization degree is measured with light having a wavelength of 650 nm instead of the light having a wavelength of 450 nm.

By arithmetic averaging the polarization degree measured by entering the light having a wavelength of 450 nm, the polarization degree measured by entering the light having a wavelength of 550 nm, and the polarization degree measured by entering the light having a wavelength of 650 nm, which are obtained as described above, the average polarization degree A is acquired.

The average polarization degree A of the light absorption anisotropic film 10A is 0.80 or more, and from the viewpoint that it is possible to further suppress the redness of the image originating from the image display device, which is reflected on the surrounding members arranged around the image display device including the light absorption anisotropic film (hereinafter, also simply referred to as "viewpoint that the effect of the present invention is more excellent"), the average polarization degree A is preferably 0.85 or more and more preferably more than 0.90.

In a case where the above-described average polarization degree A is more than 0.90, the light absorption anisotropic film 10A satisfies the following requirement A4.

Requirement A4: the average polarization degree A is more than 0.90.

The upper limit value of the average polarization degree A is not particularly limited, and is, for example, 1.00.

In addition, the retardation at a wavelength of 650 nm in the direction tilted by 50° with respect to the normal direction of the main surface of the light absorption anisotropic film 10A is less than 250 nm, and from the viewpoint that the effect of the present invention is more excellent, the retardation is preferably 240 nm or less and more preferably 230 nm or less. The lower limit thereof is not particularly limited, but is 100 nm or more in many cases and 150 nm or more in more cases.

The above-described retardation corresponds to a retardation measured by allowing the light having a wavelength of 650 nm to be incident from the direction of the white arrow (a direction of θa=)50° shown in FIG. 4.

The above-described retardation can be measured using AxoScan OPMF-1 (manufactured by Opto Science, Inc.).

The above-described retardation is a numerical value obtained by, in a case where light is incident from the direction tilted by 50° with respect to the normal direction of the main surface of the light absorption anisotropic film 10A, an in-plane phase difference on a plane orthogonal to the direction in which the light travels in the light absorption anisotropic film 10A and a length in which the light travels in the light absorption anisotropic film 10A.

In addition, in the light absorption anisotropic film 10A which is the first embodiment of the light absorption aniso-tropic film, from the viewpoint that the effect of the present invention is more excellent, it is preferable to satisfy the following requirement A2.

Requirement A2: a retardation at a wavelength of 550 nm in the direction tilted by 50° with respect to the normal direction of the main surface of the light absorption anisotropic film 10A is less than 220 nm.

Among these, from the viewpoint that the effect of the present invention is more excellent, the retardation at a wavelength of 550 nm in the direction tilted by 50° with respect to the normal direction of the main surface of the light absorption anisotropic film 10A is preferably 170 nm or less. The lower limit of the above-described retardation is not particularly limited, but is 50 nm or more in many cases and 70 nm or more in more cases.

As a method of measuring the above-described retardation at a wavelength of 550 nm, the method of measuring the retardation at a wavelength of 650 nm, which is performed in the above-described requirement A1, is used except that the wavelength is changed from 650 nm to 550 nm.

In the light absorption anisotropic film 10A which is the first embodiment of the light absorption anisotropic film, from the viewpoint that the effect of the present invention is more excellent, it is preferable to satisfy the following requirement A3.

Requirement A3: in a case where a polarization degree is measured by allowing light having a wavelength of 450 to 750 nm to be incident from the direction tilted by 50° with respect to the normal direction of the main surface of the light absorption anisotropic film 10A and a wavelength showing a maximal value of the polarization degree on a longest wavelength side is defined as Pmax, Pmax is a wavelength of more than 610 nm.

The Pmax is preferably located in a wavelength range of more than 610 nm and 750 nm or less.

The above-described polarization degree can be measured using AxoScan OPMF-1 (manufactured by Opto Science, Inc.).

As a second embodiment of the light absorption anisotropic film an aspect in which the light absorption anisotropic film is formed of a composition containing a liquid crystal compound and a dichroic substance, in which the light absorption anisotropic film has two main surfaces facing each other, and an angle between a normal direction of the main surface of the light absorption anisotropic film and a transmittance central axis of the light absorption anisotropic film is more than 0° and 45° or less, is mentioned.

Figure 5:
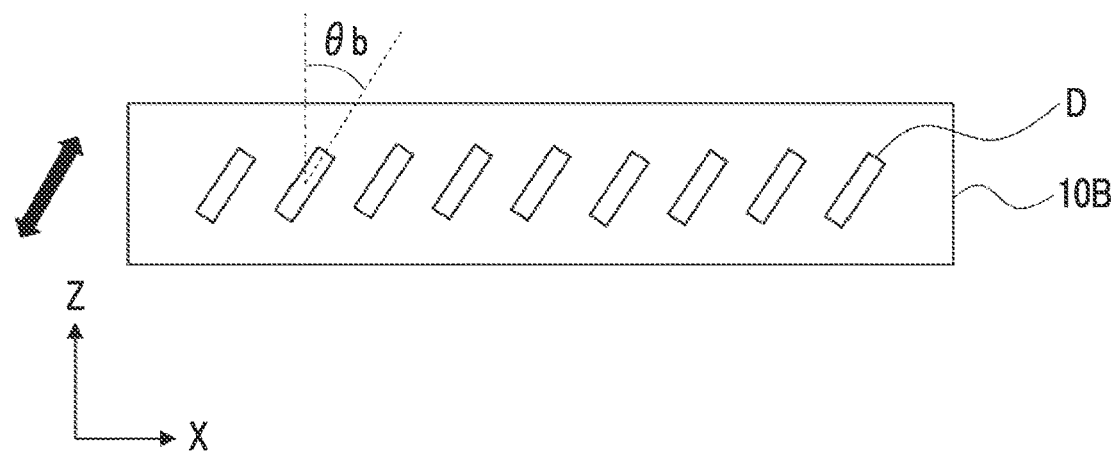
FIG. 5 is a cross-sectional view conceptually showing a second embodiment of the light absorption anisotropic film according to the present invention.
Figure 6:
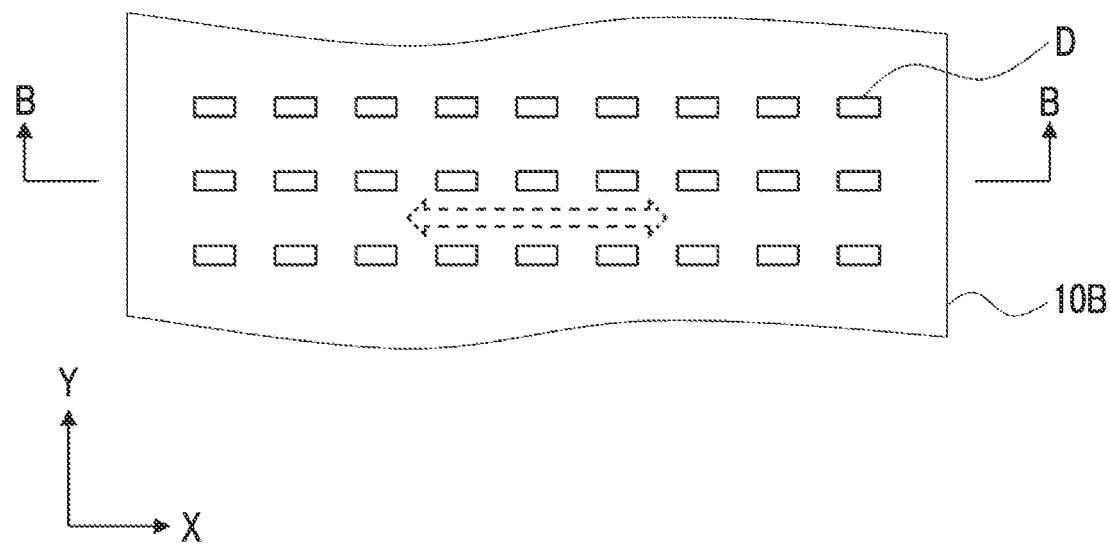
FIG. 6 is a plan view of the second embodiment of the light absorption anisotropic film according to the present invention, shown in FIG. 5.

FIG. 5 is a cross-sectional view showing a light absorption anisotropic film 10B, and FIG. 6 is a plan view showing the light absorption anisotropic film 10B shown in FIG. 5. FIG. 5 is a cross-sectional view taken along line B-B in FIG. 6.

In FIG. 5, a direction X and a direction Z represent orientations of two coordinate axes orthogonal to each other on an observation surface. The direction Z is parallel to a thickness direction of the light absorption anisotropic film 10B.

In FIG. 6, a direction X and a direction Y represent orientations of two coordinate axes orthogonal to each other on an observation surface.

In the light absorption anisotropic film 10B, the dichroic substances D are arranged such that a major axis direction of the dichroic substance D is inclined with respect to the main surface of the light absorption anisotropic film 10B.

More specifically, a direction in which the major axis direction of the dichroic substance D shown in FIGS. 5 and 6 is projected onto the surface of the light absorption anisotropic film 10B is parallel to an X-axis direction (left-right direction of the paper plane). Therefore, the X-axis direction (left-right direction of the paper plane) corresponds to an orientation in which a transmittance with respect to linearly polarized light in an in-plane direction of the light absorption anisotropic film 10B is lowest. That is, a direction of the white broken line arrow (left-right direction of the paper plane) shown in FIG. 6 corresponds to an azimuthal angle at which the transmittance central axis is inclined.

As shown in FIG. 5, the dichroic substance D in the light absorption anisotropic film 10B is tilted by θb° with respect to the normal direction of the light absorption anisotropic film 10B. Therefore, the transmittance central axis of the light absorption anisotropic film 10B is parallel to the X direction, and is located in a direction tilted by θb° with respect to the normal direction of the main surface of the light absorption anisotropic film 10B. Accordingly, in the light absorption anisotropic film 10B, the transmittance central axis corresponds to a direction indicated by the black arrow in FIG. 5, and an angle between the normal direction of the main surface of the light absorption anisotropic film 10B and the transmittance central axis is θb°.

In the light absorption anisotropic film 10B, the θb° is in a range of more than 0° and 45° or less.

The light absorption anisotropic film 10B satisfies the following requirement B1.

Requirement B1: an average polarization degree B of a polarization degree which is measured by allowing light having a wavelength of 450 nm to be incident from a direction tilted by 50° on the normal direction side with respect to the transmittance central axis of the light absorption anisotropic film 10B, a polarization degree which is measured by allowing light having a wavelength of 550 nm to be incident from the direction tilted by 50° on the normal direction side with respect to the transmittance central axis, and a polarization degree which is measured by allowing light having a wavelength of 650 nm to be incident from the direction tilted by 50° on the normal direction side with respect to the transmittance central axis is 0.80 or more, and a retardation at a wavelength of 650 nm in the direction tilted by 50° on the normal direction side with respect to the transmittance central axis is less than 250 nm.

Figure 7:
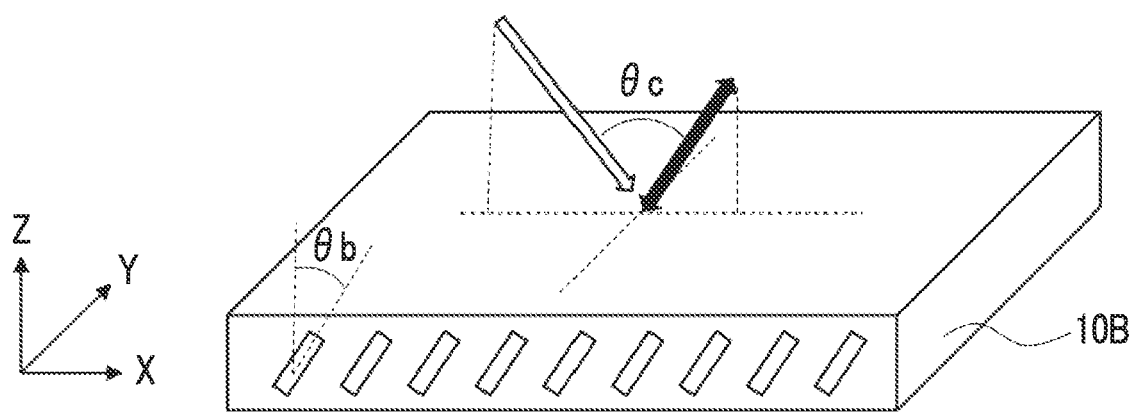
FIG. 7 is a diagram for describing an aspect in which light is incident from a direction tilted by 50° on a normal direction side with respect to a transmittance central axis of the light absorption anisotropic film according to the embodiment of the present invention.

The above-described requirement B1 will be described with reference to FIG. 7. FIG. 7 is a perspective view of the light absorption anisotropic film 10B, and as described above, in the light absorption anisotropic film 10B, the angle between the major axis direction of the dichroic substance D and the normal direction of the main surface of the light absorption anisotropic film 10B is θb°, and the angle between the normal direction of the main surface of the light absorption anisotropic film 10B and the transmittance central axis (black arrow) is θb°.

In the above-described requirement B1, as shown in FIG. 7, a polarization degree is measured by allowing light having a wavelength of 450 nm to be incident from a direction (white arrow in FIG. 7) inclined by 50° on the normal direction side with respect to the transmittance central axis of the light absorption anisotropic film 10B, which is indicated by the black arrow. That is, the light having a wavelength of 450 nm is incident from a direction in which an angle θc between the transmittance central axis indicated by the black arrow in FIG. 7 and the incident direction of light is 50°, and the polarization degree is measured. As shown in FIG. 7, the transmittance central axis, the normal direction of the main surface of the light absorption anisotropic film 10B, and the incident direction of light are located on the same plane.

The polarization degree is measured using AxoScan OPMF-1 (manufactured by Opto Science, Inc.).

The definition of the above-described polarization degree is as described above.

In addition, the polarization degree is measured with light having a wavelength of 550 nm instead of the light having a wavelength of 450 nm. Furthermore, the polarization degree is measured with light having a wavelength of 650 nm instead of the light having a wavelength of 450 nm.

By arithmetic averaging the polarization degree measured by entering the light having a wavelength of 450 nm, the polarization degree measured by entering the light having a wavelength of 550 nm, and the polarization degree measured by entering the light having a wavelength of 650 nm, which are obtained as described above, the average polarization degree B is acquired.

The average polarization degree B of the light absorption anisotropic film 10B is 0.80 or more, and from the viewpoint that the effect of the present invention is more excellent, the average polarization degree B is preferably 0.85 or more and more preferably more than 0.90.

In a case where the above-described average polarization degree B is more than 0.90, the light absorption anisotropic film 10B satisfies the following requirement B4.

Requirement B4: the average polarization degree B is more than 0.90.

The upper limit value of the average polarization degree B is not particularly limited, and is, for example, 1.00.

In addition, the retardation at a wavelength of 650 nm in the direction tilted by 50° on the normal direction side with respect to the transmittance central axis of the light absorption anisotropic film 10B is less than 250 nm, and from the viewpoint that the effect of the present invention is more excellent, the retardation is preferably 240 nm or less and more preferably 230 nm or less. The lower limit thereof is not particularly limited, but is 100 nm or more in many cases and 150 nm or more in more cases.

The above-described retardation corresponds to a retardation measured by allowing the light having a wavelength of 650 nm to be incident from the direction of the white arrow shown in FIG. 7.

The above-described retardation can be measured using AxoScan OPMF-1 (manufactured by Opto Science, Inc.).

In addition, in the light absorption anisotropic film 10B which is the second embodiment of the light absorption anisotropic film, from the viewpoint that the effect of the present invention is more excellent, it is preferable to satisfy the following requirement B2.

Requirement B2: a retardation at a wavelength of 550 nm in the direction tilted by 50° on the normal direction side with respect to the transmittance central axis of the light absorption anisotropic film 10B is less than 220 nm.

Among these, from the viewpoint that the effect of the present invention is more excellent, the retardation at a wavelength of 550 nm in the direction tilted by 50° on the normal direction side with respect to the transmittance central axis of the light absorption anisotropic film 10B is preferably 170 nm or less. The lower limit of the above-described retardation is not particularly limited, but is 50 nm or more in many cases and 70 nm or more in more cases.

As a method of measuring the above-described retardation at a wavelength of 550 nm, the method of measuring the retardation at a wavelength of 650 nm, which is performed in the above-described requirement B1, is used except that the wavelength is changed from 650 nm to 550 nm.

In the light absorption anisotropic film 10B which is the second embodiment of the light absorption anisotropic film, from the viewpoint that the effect of the present invention is more excellent, it is preferable to satisfy the following requirement B3.

Requirement B3: in a case where a polarization degree is measured by allowing light having a wavelength of 450 to 750 nm to be incident from the direction tilted by 50° on the normal direction side with respect to the transmittance central axis of the light absorption anisotropic film 10B and a wavelength showing a maximal value of the polarization degree on a longest wavelength side is defined as Pmax, Pmax is a wavelength of more than 610 nm.

The Pmax is preferably located in a wavelength range of more than 610 nm and 750 nm or less.

The above-described polarization degree can be measured using AxoScan OPMF-1 (manufactured by Opto Science, Inc.).

Examples of a technique of desirably aligning the dichroic substance D include a technique of producing a polarizer using the dichroic substance D and a technique of producing a guest-host liquid crystal cell. For example, techniques used in the method of producing a dichroic polarizer, described in JP1999-305036A (JP-H11-305036A) and JP2002-090526A, and the method of producing a guest-host type liquid crystal display device, described in JP2002-099388A and JP2016-027387A, can be used for the production of the light absorption anisotropic film.

In order to prevent fluctuation of light absorption characteristics of the light absorption anisotropic film depending on the use environment, it is preferable that the alignment of the dichroic substance D is fixed by forming a chemical bond. For example, the alignment can be fixed by promoting the polymerization of the host liquid crystal, the dichroic substance, or a polymerizable component to be added as desired. More specifically, the light absorption anisotropic film may be a layer formed by immobilizing a liquid crystal compound forming a smectic phase or a nematic phase.

In addition, the light absorption anisotropic film can be produced by allowing the dichroic substance to permeate into a polymer film and aligning the dichroic substance along an alignment of polymer molecules in the polymer film.

A thickness of the light absorption anisotropic film is not particularly limited, but from the viewpoint that the effect of the present invention is more excellent, the thickness is preferably 1 to 7 μm and more preferably 1.5 to 5 μm.

(Dichroic Substance)

In the present invention, as described above, the dichroic substance means a coloring agent having different absorbances depending on directions. The dichroic substance may be immobilized by polymerization in the light absorption anisotropic film.

The dichroic substance is not particularly limited, and examples thereof include a visible light absorbing material (dichroic coloring agent), a light emitting material (such as a fluorescent material or a phosphorescent material), an ultraviolet absorbing material, an infrared absorbing material, a non-linear optical material, a carbon nanotube, and an inorganic material (for example, a quantum rod). In addition, known dichroic substances (preferably, dichroic coloring agents) of the related art can be used.

Specific examples thereof include those described in paragraphs [0067] to [0071] of JP2013-228706A, paragraphs [0008] to [0026] of JP2013-227532A, paragraphs [0008] to [0015] of JP2013-209367A, paragraphs [0009] to [0017] of JP2013-14883A, paragraphs [0012] to [0029] of JP2013-109090A, paragraphs [0009] to [0017] of JP2013-101328A, paragraphs [0051] to [0065] of JP2013-037353A, paragraphs [0049] to [0073] of JP2012-063387A, paragraphs [0016] to [0018] of JP1999-305036A (JP-H11-305036A), paragraphs [0009] to [0011] of JP2001-133630A, paragraphs [0030] to [0169] of JP2011-215337A, paragraphs [0021] to [0075] of JP2010-106242A, paragraphs [0011] to [0025] of JP2010-215846A, paragraphs [0017] to [0069] of JP2011-048311A, paragraphs [0013] to [0133] of JP2011-213610A, paragraphs [0074] to [0246] of JP2011-237513A, paragraphs [0005] to [0051] of JP2016-006502A, paragraphs [0004] to [0041] of WO2016/060173A, paragraphs [0008] to [0062] of WO2016/136561A, paragraphs [0041] to [0033] of WO2017/154835A, paragraphs [0014] to [0033] of WO2017/154695A, paragraphs [0013] to [0037] of WO2017/195833A, and paragraphs [0014] to [0034] of WO2018/164252A.

As the dichroic substance, a dichroic azo coloring agent compound is preferable.

The dichroic azo coloring agent compound denotes an azo coloring agent compound having different absorbances depending on the direction. The dichroic azo coloring agent compound may or may not exhibit liquid crystallinity. In a case where the dichroic azo coloring agent compound exhibits liquid crystallinity, any of nematic properties or smectic properties may be exhibited. A temperature range at which the liquid crystal phase is exhibited is preferably room temperature (approximately 20° C. to 28° C.) to 300° C., and from the viewpoint of handleability and manufacturing suitability, more preferably 50° C. to 200° C.

In the present invention, from the viewpoint of adjusting tint, it is preferable to use at least one coloring agent compound having a maximal absorption wavelength in a wavelength range of 560 to 700 nm (hereinafter, also abbreviated as "first dichroic azo coloring agent compound") and at least one coloring agent compound having a maximal absorption wavelength in a wavelength range of 455 nm or more and less than 560 nm (hereinafter, also abbreviated as "second dichroic azo coloring agent compound"), and specifically, it is more preferable to use at least a dichroic azo coloring agent compound represented by Formula (1) and a dichroic azo coloring agent compound represented by Formula (2).

In the present invention, three or more kinds of dichroic azo coloring agent compounds may be used in combination. For example, from the viewpoint of making color of the light absorption anisotropic film close to black, it is preferable to use the first dichroic azo coloring agent compound, the second dichroic azo coloring agent compound, and at least one coloring agent compound having a maximal absorption wavelength in a wavelength range of 380 nm or more and less than 455 nm (hereinafter, also abbreviated as "third dichroic azo coloring agent compound") in combination.

In the present invention, it is preferable that the dichroic azo coloring agent compound has a crosslinkable group.

Examples of the crosslinkable group include a (meth)acryloyl group, an epoxy group, an oxetanyl group, and a styryl group, and among these, a (meth)acryloyl group is preferable.

[First Dichroic Azo Coloring Agent Compound]

It is preferable that the first dichroic azo coloring agent compound is a compound having a chromophore which is a nucleus and a side chain bonded to a terminal of the chromophore.

Specific examples of the chromophore include an aromatic ring group (such as an aromatic hydrocarbon group and an aromatic heterocyclic group) and an azo group, and a structure having both the aromatic ring group and the azo group is preferable, and a bisazo structure having the aromatic heterocyclic group (preferably a thienothiazole group) and two azo groups is more preferable.

The side chain is not particularly limited, and examples thereof include a group represented by R1, R2, or R3 in Formula (1) described later.

The first dichroic azo coloring agent compound is a dichroic azo coloring agent compound having a maximum absorption wavelength in a wavelength range of 560 to 700 nm, and from the viewpoint of adjusting the tint of the light absorption anisotropic film, it is preferably a dichroic azo coloring agent compound having a maximum absorption wavelength in a wavelength range of 560 to 650 nm and more preferably a dichroic azo coloring agent compound having a maximum absorption wavelength in a wavelength range of 560 to 640 nm.

The maximum absorption wavelength (nm) of the dichroic azo coloring agent compound in the present specification is acquired from an ultraviolet visible spectrum in a wavelength range of 380 to 800 nm, which is measured with a spectrophotometer using a solution prepared by dissolving the dichroic azo coloring agent compound in a good solvent.

In the present invention, from the viewpoint of further improving the polarization degree of the light absorption anisotropic film, it is preferable that the first dichroic azo coloring agent compound is a compound represented by Formula (1).

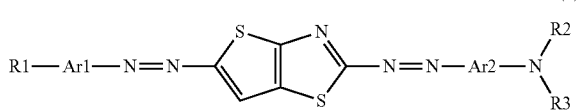

(1)

In Formula (1), Ar1 and Ar2 each independently represent a phenylene group which may have a substituent or a naphthylene group which may have a substituent, and a phenylene group is preferable.

In Formula (1), R1 represents a hydrogen atom, a linear or branched alkyl group having 1 to 20 carbon atoms, which may have a substituent, an alkoxy group, an alkylthio group, an alkylsulfonyl group, an alkylcarbonyl group, an alkyloxycarbonyl group, an acyloxy group, an alkylcarbonate group, an alkylamino group, an acylamino group, an alkylcarbonylamino group, an alkoxycarbonylamino group, an alkylsulfonylamino group, an alkylsulfamoyl group, an alkylcarbamoyl group, an alkylsulfinyl group, an alkylureido group, an alkylphosphoric acid amide group, an alkylimino group, or an alkylsilyl group.

—CH$_2$— constituting the above-described alkyl group may be substituted with —O—, —CO—, —C(O)—O—, —Si(CH$_3$)$_2$—O—Si(CH$_3$)$_2$—, —N(R1')—, —N(R1')—CO—, —N(R1')—C(O)—O—, —N(R1')—C(O)—N(R1')—, —CH=CH—, —N=N—, —C(R1')=CH—C(O)—, or —O—C(O)—O—.

In a case where R1 represents a group other than a hydrogen atom, the hydrogen atom in each group may be substituted with a halogen atom, a nitro group, a cyano group, —N(R1')$_2$, an amino group, —C(R1')=C(R1')—NO$_2$, —C(R1')=C(R1')—CN, or —C(R1')=C(CN)$_2$.

R1' represents a hydrogen atom or a linear or branched alkyl group having 1 to 6 carbon atoms. In a case where a plurality of (R1')'s are present in each group, these may be the same or different from each other.

In Formula (1), R2 and R3 each independently represent a hydrogen atom, a linear or branched alkyl group having 1 to 20 carbon atoms, which may have a substituent, an alkoxy group, an acyl group, an alkyloxycarbonyl group, an alkylamide group, an alkylsulfonyl group, an aryl group, an arylcarbonyl group, an arylsulfonyl group, an aryloxycarbonyl group, or an arylamide group.

—CH$_2$— constituting the above-described alkyl group may be substituted with —O—, —S—, —C(O)—, —C(O)—O—, —C(O)—S—, —Si(CH$_3$)$_2$—O—Si(CH$_3$)$_2$—, —NR$_2$'—, —NR2'—CO—, —NR2'—C(O)—O—, —NR2'—C(O)—NR$_2$'—, —CH=CH—, —N=N—, —C(R2')=CH—C(O)—, or —O—C(O)—O—.

In a case where R2 and R3 represent a group other than a hydrogen atom, the hydrogen atom of each group may be substituted with a halogen atom, a nitro group, a cyano group, a —OH group, —N(R2')$_2$, an amino group, —C(R2')=C(R2')—NO$_2$, —C(R2')=C(R2')—CN, or —C(R2')=C(CN)$_2$.

R2' represents a hydrogen atom or a linear or branched alkyl group having 1 to 6 carbon atoms. In a case where a plurality of (R2')'s are present in each group, these may be the same or different from each other.

R2 and R3 may be bonded to each other to form a ring, or R2 or R3 may be bonded to Ar2 to form a ring.

It is preferable that R1 is an electron withdrawing group and R2 and R3 are a group having a low electron-donating property.

Specific examples of R1 in such a group include an alkylsulfonyl group, an alkylcarbonyl group, an alkyloxycarbonyl group, an acyloxy group, an alkylsulfonylamino group, an alkylsulfamoyl group, an alkylsulfinyl group, and an alkylureido group, and specific examples of R2 and R3 in such a group include groups having the following structures. The groups having the following structures are shown in a form having a nitrogen atom to which R2 and R3 are bonded in Formula (1).

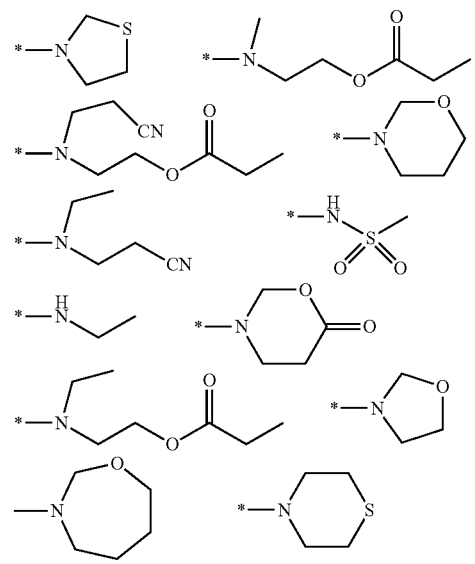

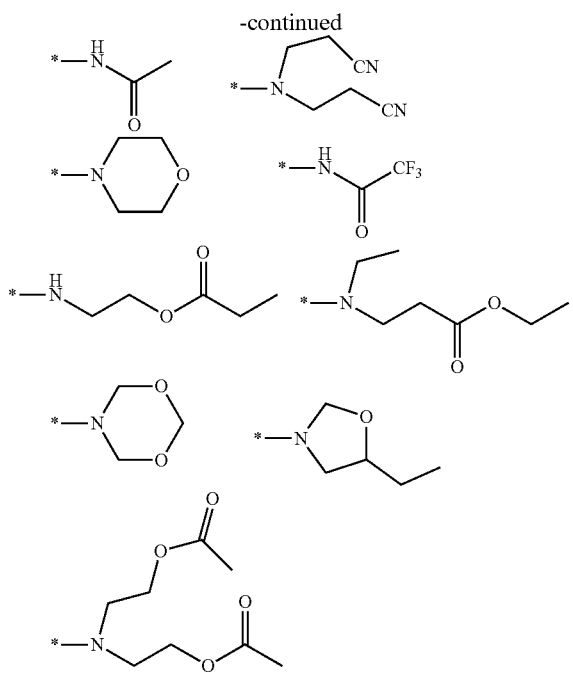

[Second Dichroic Azo Coloring Agent Compound]

The second dichroic azo coloring agent compound is a compound different from the first dichroic azo coloring agent compound, and specifically, a chemical structure thereof is different from that of the first dichroic azo coloring agent compound.

It is preferable that the second dichroic azo coloring agent compound is a compound having a chromophore which is a nucleus of a dichroic azo coloring agent compound and a side chain bonded to a terminal of the chromophore.

Specific examples of the chromophore include an aromatic ring group (such as an aromatic hydrocarbon group and an aromatic heterocyclic group) and an azo group, and a structure having both the aromatic hydrocarbon group and the azo group is preferable, and a trisazo structure having the aromatic hydrocarbon group and two or three azo groups is more preferable.

The side chain is not particularly limited, and examples thereof include a group represented by R4, R5, or R6 in Formula (2) described later.

The second dichroic azo coloring agent compound is a dichroic azo coloring agent compound having a maximum absorption wavelength in a wavelength range of 455 nm or more and less than 560 nm, and from the viewpoint of adjusting the tint of the light absorption anisotropic film, it is preferably a dichroic azo coloring agent compound having a maximum absorption wavelength in a wavelength range of 455 to 555 nm and more preferably a dichroic azo coloring agent compound having a maximum absorption wavelength in a wavelength range of 455 to 550 nm.

In particular, the tint of the light absorption anisotropic film is easily adjusted by using the first dichroic azo coloring agent compound having a maximum absorption wavelength in a range of 560 to 700 nm and the second dichroic azo coloring agent compound having a maximum absorption wavelength in a range of 455 nm or more and less than 560 nm.

From the viewpoint of further improving the polarization degree of the light absorption anisotropic film, it is prefer- able that the second dichroic azo coloring agent compound is a compound represented by Formula (2).

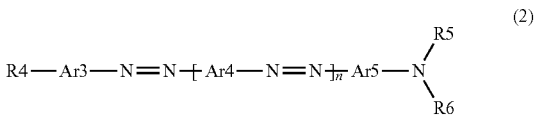

In Formula (2), n represents 1 or 2.

In Formula (2), Ar3, Ar4, and Ar5 each independently represent a phenylene group which may have a substituent, a naphthylene group which may have a substituent, or a heterocyclic group which may have a substituent.

The heterocyclic group may be aromatic or non-aromatic.

Examples of atoms other than carbon, constituting the aromatic heterocyclic group, include a nitrogen atom, a sulfur atom, and an oxygen atom. In a case where the aromatic heterocyclic group has a plurality of atoms other than carbon, constituting a ring, these atoms may be the same or different from each other.

Specific examples of the aromatic heterocyclic group include a pyridylene group (pyridine-diyl group), a pyridazine-diyl group, an imidazole-diyl group, a thienylene group (thiophene-diyl group), a quinolylene group (quino- line-diyl group), an isoquinolylene group (isoquinoline-diyl group), an oxazole-diyl group, a thiazole-diyl group, an oxadiazole-diyl group, a benzothiazole-diyl group, a benzo- thiadiazole-diyl group, a phthalimido-diyl group, a thienothiazole-diyl group, a thiazolothiazole-diyl group, a thienothiophene-diyl group, and a thienooxazole-diyl group.

In Formula (2), R4 has the same definition as that for R1 in Formula (1).

In Formula (2), R5 and R6 each have the same definition as that for R2 and R3 in Formula (1).

From the viewpoint of light resistance, it is preferable that R4 is an electron withdrawing group and R5 and R6 are a group having a low electron-donating property.

Among such groups, specific examples of the case where R4 is an electron withdrawing group are the same as the specific examples of the case where R1 is an electron withdrawing group; and specific examples of the case where R5 and R6 are a group having a low electron-donating property are the same as the specific examples of the case where R2 and R3 are a group having a low electron-donating property.

A log P value is an index expressing hydrophilicity and hydrophobicity of a chemical structure. An absolute value of a difference (hereinafter, also referred to as "difference in log P value") between a log P value of a side chain of the first dichroic azo coloring agent compound and a log P value of a side chain of the second dichroic azo coloring agent compound is preferably 2.30 or less, more preferably 2.0 or less, still more preferably 1.5 or less, and particularly preferably 1.0 or less. In a case where the difference in log P value is 2.30 or less, since affinity between the first dichroic azo coloring agent compound and the second dichroic azo coloring agent compound is enhanced and an arrangement structure is more easily formed, the polariza- tion degree of the light absorption anisotropic film is further improved.

In a case where the first dichroic azo coloring agent compound or the second dichroic azo coloring agent com- pound has a plurality of side chains, it is preferable that at least one difference in log P value satisfies the above- described value.

Here, the side chain of the first dichroic azo coloring agent compound and the side chain of the second dichroic azo coloring agent compound mean a group bonded to the terminal of the above-described chromophore. For example, R1, R2, and R3 in Formula (1) are the side chain in a case where the first dichroic azo coloring agent compound is the compound represented by Formula (1), and R4, R5, and R6 in Formula (2) are the side chain in a case where the second dichroic azo coloring agent compound is the compound represented by Formula (2). In particular, in a case where the first dichroic azo coloring agent compound is the compound represented by Formula (1) and the second dichroic azo coloring agent compound is the compound represented by Formula (2), it is preferable that at least one difference in log P value among the difference in log P value between R1 and R4, the difference in log P value between R1 and R5, the difference in log P value between R2 and R4, and the difference in log P value between R2 and R5 satisfies the above-described value.

Here, the log P value is an index for expressing properties of hydrophilicity and hydrophobicity of a chemical structure, and is also referred to as a hydrophilic-hydrophobic parameter. The log P value can be calculated using software such as ChemBioDraw Ultra or HSPiP (Ver. 4.1.07). In addition, the log P value can be acquired experimentally by the method of the OECD Guidelines for the Testing of Chemicals, Sections 1, Test No. 117, or the like. In the present invention, a value calculated by inputting the structural formula of a compound to HSPiP (Ver. 4.1.07) is adopted as the log P value unless otherwise specified.

[Third Dichroic Azo Coloring Agent Compound]

The third dichroic azo coloring agent compound is a dichroic azo coloring agent compound other than the first dichroic azo coloring agent compound and the second dichroic azo coloring agent compound, and specifically, a chemical structure thereof is different from those of the first dichroic azo coloring agent compound and the second dichroic azo coloring agent compound. In a case where the light absorption anisotropic film contains the third dichroic azo coloring agent compound, there is an advantage that the tint of the light absorption anisotropic film is easily adjusted.

The maximum absorption wavelength of the third dichroic azo coloring agent compound is 380 nm or more and less than 455 nm, preferably 385 to 454 nm.

As the third dichroic azo coloring agent compound, a dichroic azo coloring agent represented by Formula (6) is preferable.

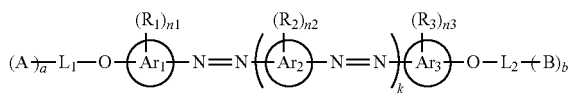

(6)

In Formula (6), A and B each independently represent a crosslinkable group.

In Formula (6), a and b each independently represent 0 or 1. From the viewpoint that the polarization degree at a wavelength of 420 nm is excellent, it is preferable that both a and b are 0.

In Formula (6), $L_1$ represents a monovalent substituent in a case where a is 0, and $L_1$ represents a single bond or a divalent linking group in a case where a is 1. In addition, $L_2$ represents a monovalent substituent in a case where b is 0, and $L_2$ represents a single bond or a divalent linking group in a case where b is 1.

In Formula (6), $Ar_1$ represents an (n1+2)-valent aromatic hydrocarbon group or heterocyclic group, $Ar_2$ represents an (n2+2)-valent aromatic hydrocarbon group or heterocyclic group, and $Ar_3$ represents an (n3+2)-valent aromatic hydrocarbon group or heterocyclic group.

In Formula (6), R1, R2, and $R_3$ each independently represent a monovalent substituent. A plurality of $R_1$'s may be the same or different from each other in a case of "n1≥2", a plurality of $R_2$'s may be the same or different from each other in a case of "n2≥2", and a plurality of $R_3$'s may be the same or different from each other in a case of "n3≥2".

In Formula (6), k represents an integer of 1 to 4. In a case of "k≥2", a plurality of $Ar_2$'s may be the same or different from each other, and a plurality of $R_2$'s may be the same or different from each other.

In Formula (6), n1, n2, and n3 each independently represent an integer of 0 to 4. Here, an expression of "n1+n2+n3≥0" is satisfied in a case of "k=1", and an expression of "n1+n2+n3≥1" is satisfied in a case of "k≥2".

In Formula (6), examples of the crosslinkable group represented by A and B include polymerizable groups described in paragraphs [0040] to [0050] of JP2010-244038A. Among these, an acryloyl group, a methacryloyl group, an epoxy group, an oxetanyl group, or a styryl group is preferable from the viewpoint of improving reactivity and synthetic suitability, and an acryloyl group or a methacryloyl group is more preferable from the viewpoint of further improving solubility.

In Formula (6), $L_1$ represents a monovalent substituent in a case where a is 0, and $L_1$ represents a single bond or a divalent linking group in a case where a is 1. In addition, $L_2$ represents a monovalent substituent in a case where b is 0, and $L_2$ represents a single bond or a divalent linking group in a case where b is 1.

As the monovalent substituent represented by $L_1$ and $L_2$, a group to be introduced to increase the solubility of the dichroic substance or a group having an electron-donating property and an electron-withdrawing property, which is to be introduced to adjust the color tone of the coloring agent, is preferable.

Examples of the sub stituent include an alkyl group, an alkenyl group, an alkynyl group, an aryl group, a substituted or unsubstituted amino group, an alkoxy group, an oxycarbonyl group, an acyloxy group, an acylamino group, an alkoxycarbonylamino group, an aryloxycarbonylamino group, a sulfonylamino group, a sulfamoyl group, a carbamoyl group, an alkylthio group, an arylthio group, a sulfonyl group, a sulfinyl group, an ureido group, a phosphoric acid amide group, a heterocyclic group, a silyl group, a halogen atom, a hydroxy group, a mercapto group, a cyano group, a nitro group, a hydroxamic acid group, a sulfino group, a hydrazino group, an imino group, and an azo group.

These substituents may be further substituted with these substituents. In addition, in a case where two or more substituents are present, these may be the same or different from each other. Furthermore, if possible, these substituents may be bonded to each other to form a ring.

Examples of a group in which the above-described substituent is further substituted with the above-described substituent include an $R_B$—(O—$R_A$)$_{na}$— group which is a group in which an alkoxy group is substituted with an alkyl group. Here, in the formula, $R_A$ represents an alkylene group having 1 to 5 carbon atoms, $R_B$ represents an alkyl group having 1 to 5 carbon atoms, and na represents an integer of 1 to 10 (preferably an integer of 1 to 5 and more preferably an integer of 1 to 3).

Among these, as the monovalent substituent represented by $L_1$ and $L_2$, an alkyl group, an alkenyl group, an alkoxy group, or a group in which these groups are further substituted with these groups (for example, $R_B$—(O—$R_A$)$_{na}$— group described above) is preferable; and an alkyl group, an alkoxy group, or a group in which these groups are further substituted with these groups (for example, $R_B$—(O—$R_A$)$_{na}$— group described above) is more preferable.

Examples of the divalent linking group represented by $L_1$ and $L_2$ include —O—, —S—, —CO—, —COO—, —O—CO—O—, —CO—NR$_N$—, —O—CO—NR$_N$—, —NR$_N$—CO—NR$_N$—, —SO$_2$—, —SO—, an alkylene group, a cycloalkylene group, an alkenylene group, and a group obtained by combining two or more of these groups.

In addition, in a case where A is not present, the "number of atoms in the main chain" of $L_1$ denotes the number of atoms in $L_1$ which does not have a branched chain. In a case where B is not present, the "number of atoms in the main chain" of $L_2$ denotes the number of atoms in $L_2$ which does not have a branched chain.

Specifically, in Formula (D1), the number of atoms in the main chain of $L_1$ (the number of atoms in the dotted frame on the left side of Formula (D1)) is 5, and the number of atoms in the main chain of $L_2$ (the number of atoms in the dotted frame on the right side of Formula (D1)) is 5. In addition, in Formula (D10), the number of atoms in the main chain of $L_1$ (the number of atoms in the dotted frame on the left side of Formula (D10)) is 7, and the number of atoms in the main chain of $L_2$ (the number of atoms in the dotted frame on the right side of Formula (D10)) is 5.

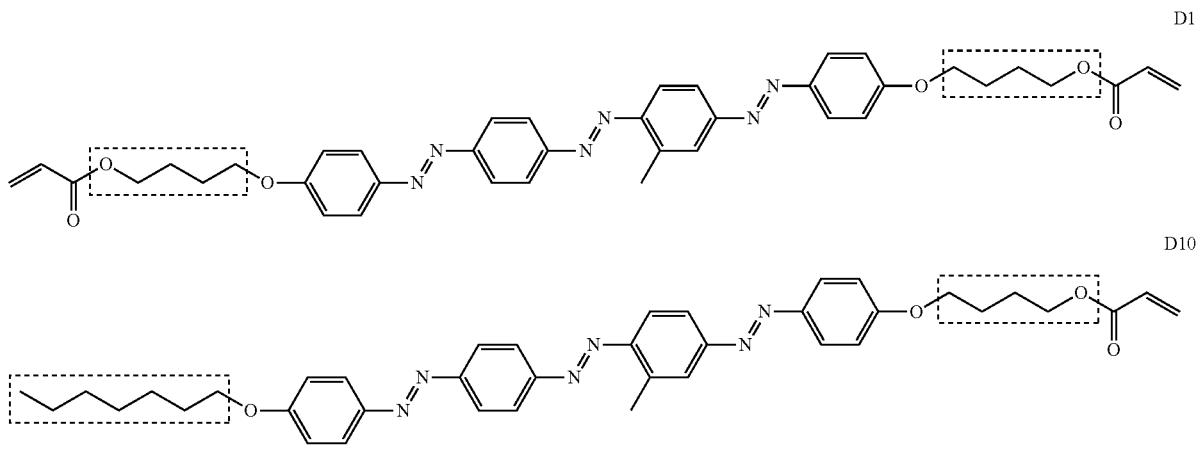

Among these, a group obtained by combining an alkylene group with one or more groups selected from the group consisting of —O—, —COO—, and —O—CO—O— is preferable.

Here, $R_N$ represents a hydrogen atom or an alkyl group. In a case where a plurality of $R_N$'s are present, the plurality of $R_N$'s may be the same or different from each other.

From the viewpoint of further improving the solubility of the dichroic substance, the number of atoms in a main chain of at least one of $L_1$ or $L_2$ is preferably 3 or more, more preferably 5 or more, still more preferably 7 or more, and particularly preferably 10 or more. In addition, the upper limit value of the number of atoms in the main chain is preferably 20 or less and more preferably 12 or less.

On the other hand, from the viewpoint of further improving the polarization degree of the light absorption anisotropic film, the number of atoms in the main chain of at least one of $L_1$ or $L_2$ is preferably 1 to 5.

Here, in a case where A is present in Formula (6), the "main chain" of $L_1$ denotes a portion required for directly linking "A" with the "O" atom linked to $L_1$, and the "number of atoms in the main chain" denotes the number of atoms constituting the portion. Similarly, in a case where B is present in Formula (6), the "main chain" of $L_2$ denotes a portion required for directly linking "B" with the "O" atom linked to $L_2$, and the "number of atoms in the main chain" denotes the number of atoms constituting the portion. The "number of atoms in the main chain" does not include the number of atoms in a branched chain described below.

$L_1$ and $L_2$ may have a branched chain.

Here, in a case where A is present in Formula (6), the "branched chain" of $L_1$ denotes a portion other than the portion required for directly linking "A" with the "O" atom linked to $L_1$ in Formula (6). Similarly, in a case where B is present in Formula (6), the "branched chain" of $L_2$ denotes a portion other than the portion required for directly linking "B" with the "O" atom linked to $L_2$ in Formula (6).

In addition, in a case where A is not present in Formula (6), the "branched chain" of $L_1$ denotes a portion other than the longest atomic chain (that is, the main chain) extending from the "O" atom linked to $L_1$ in Formula (6), which is the starting point. Similarly, in a case where B is not present in Formula (6), the "branched chain" of $L_2$ denotes a portion other than the longest atomic chain (that is, the main chain) extending from the "O" atom linked to $L_2$ in Formula (6), which is a starting point.

The number of atoms in the branched chain is preferably 3 or less. In a case where the number of atoms in the branched chain is 3 or less, there is an advantage that the polarization degree of the light absorption anisotropic film is further improved. The number of atoms in the branched chain does not include the number of hydrogen atoms.

In Formula (6), $Ar_1$ represents an (n1+2)-valent (for example, a trivalent in a case where n1 is 1) aromatic hydrocarbon group or heterocyclic group, $Ar_2$ represents an (n2+2)-valent (for example, a trivalent in a case where n2 is 1) aromatic hydrocarbon group or heterocyclic group, and Ar₃ represents an (n3+2)-valent (for example, a trivalent in a case where n3 is 1) aromatic hydrocarbon group or heterocyclic group. Here, $Ar_1$ to $Ar_3$ can be respectively rephrased as a divalent aromatic hydrocarbon group or a divalent heterocyclic group substituted with n1 to n3 substituents ($R_1$ to $R_3$ described below).

The divalent aromatic hydrocarbon group represented by $Ar_1$ to $Ar_3$ may be monocyclic or may have a bicyclic or higher-cyclic fused-ring structure. From the viewpoint of further improving the solubility, the number of rings in the divalent aromatic hydrocarbon group is preferably 1 to 4, more preferably 1 or 2, and still more preferably 1 (that is, a phenylene group).

Specific examples of the divalent aromatic hydrocarbon group include a phenylene group, an azulene-diyl group, a naphthylene group, a fluorene-diyl group, an anthracene-diyl group, and a tetracene-diyl group. From the viewpoint of further improving the solubility, a phenylene group or a naphthylene group is preferable, and a phenylene group is more preferable.

From the viewpoint that the polarization degree at a wavelength of 420 nm is excellent, it is preferable that the third dichroic azo coloring agent compound does not have a radically polymerizable group.

From the viewpoint of further improving the polarization degree of the light absorption anisotropic film, it is more preferable that the third dichroic azo coloring agent compound is a dichroic substance having a structure represented by Formula (1-1).

preferably 8 to 35 parts by mass with respect to 100 mass by mass of the total content of the dichroic substance in the light absorption anisotropic film.

A content of the third dichroic azo coloring agent compound is preferably 3 to 35 parts by mass and more preferably 5 to 35 parts by mass with respect to 100 mass by mass of the content of the dichroic azo coloring agent compound in the light absorption anisotropic film.

A content ratio between the first dichroic azo coloring agent compound, the second dichroic azo coloring agent compound, and the third dichroic azo coloring agent compound used as necessary can be optionally set in order to adjust the tint of the light absorption anisotropic film. However, the content ratio of the second dichroic azo coloring agent compound to the first dichroic azo coloring agent compound (second dichroic azo coloring agent compound/first dichroic azo coloring agent compound) is preferably 0.1 to 10, more preferably 0.2 to 5, and particularly preferably 0.3 to 0.8 in terms of moles. In a case where the content ratio of the second dichroic azo coloring agent compound to the first dichroic azo coloring agent compound is within the above-described range, the polarization degree is increased.

(Liquid Crystal Compound)

The light absorption anisotropic film preferably contains a liquid crystal compound. In this manner, the dichroic substance can be aligned with a high alignment degree while precipitation of the dichroic substance is restrained.

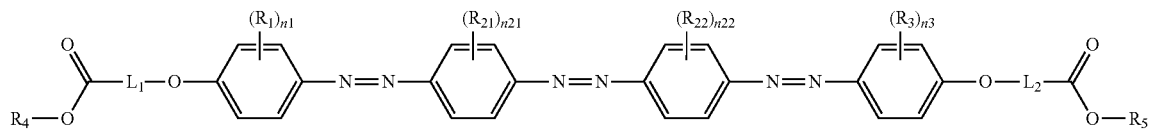

(1-1)

In Formula (1-1), $R_1$, $R_3$, $R_4$, $R_5$, n1, n3, $L_1$, and $L_2$ each have the same definition as that for $R_1$, $R_3$, $R_4$, $R_5$, n1, n3, $L_1$, and $L_2$ of Formula (1).

In Formula (1-1), $R_{21}$ and $R_{22}$ each independently have the same definition as that for $R_2$ in Formula (1).

In Formula (1-1), n21 and n22 each independently have the same definition as that for n2 in Formula (1).

An expression of "n1+n21+n22+n3≥1" is satisfied, and "n1+n21+n22+n3" is preferably 1 to 9 and more preferably 1 to 5.

A content of the dichroic substance in the light absorption anisotropic film is not particularly limited, but from the viewpoint that the effect of the present invention is more excellent, the content of the dichroic substance is preferably 15% by mass or more and more preferably 30% by mass or more with respect to the total content of the liquid crystal compound and the dichroic substance. The upper limit of the above-described content is not particularly limited, but is 45% by mass or less in many cases and 35% by mass or less in more cases.

A content of the first dichroic azo coloring agent compound is preferably 40 to 90 parts by mass and more preferably 45 to 75 parts by mass with respect to 100 parts by mass of the total content of the dichroic substance in the light absorption anisotropic film.

A content of the second dichroic azo coloring agent compound is preferably 6 to 50 parts by mass and more As the liquid crystal compound, both a high-molecular-weight liquid crystal compound and a low-molecular-weight liquid crystal compound can be used, and from the viewpoint of increasing the alignment degree, a high-molecular-weight liquid crystal compound is preferable. In addition, the high-molecular-weight liquid crystal compound and the low-molecular-weight liquid crystal compound may be used in combination as the liquid crystal compound.

Here, the "high-molecular-weight liquid crystal compound" refers to a liquid crystal compound having a repeating unit in the chemical structure.

In addition, the "low-molecular-weight liquid crystal compound" refers to a liquid crystal compound having no repeating unit in the chemical structure.

Examples of the high-molecular-weight liquid crystal compound include thermotropic liquid crystalline polymers described in JP2011-237513A and high-molecular-weight liquid crystal compounds described in paragraphs [0012] to [0042] of WO2018/199096A.

Examples of the low-molecular-weight liquid crystal compound include liquid crystal compounds described in paragraphs [0072] to [0088] of JP2013-228706A, and among these, a liquid crystal compound exhibiting smectic properties is preferable.

From the viewpoint of further increasing the alignment degree of the dichroic substance, the liquid crystal compound is preferably a high-molecular-weight liquid crystal compound having a repeating unit represented by Formula (1) (hereinafter, also simply referred to as "repeating unit (1)").

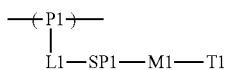
(1)

In Formula (1), P1 represents a main chain of the repeating unit, L1 represents a single bond or a divalent linking group, SP1 represents a spacer group, M1 represents a mesogen group, and T1 represents a terminal group.

Examples of the main chain of the repeating unit, represented by P1, include groups represented by Formulae (P1-A) to (P1-D). Among these, from the viewpoint of diversity and handleability of a monomer serving as a raw material, a group represented by Formula (P1-A) is preferable.

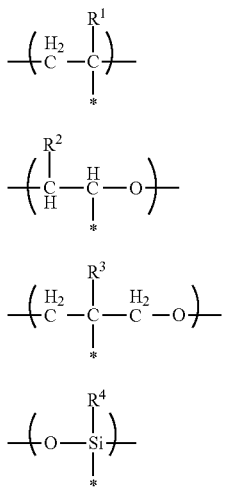

In Formulae (P1-A) to (P1-D), "*" represents a bonding position to L1 in Formula (1).

In Formulae (P1-A) to (P1-D), $R^2$, $R^3$, and $R^4$ each independently represent a hydrogen atom, a halogen atom, a cyano group, an alkyl group having 1 to 10 carbon atoms, or an alkoxy group having 1 to 10 carbon atoms. The above-described alkyl group may be a linear or branched alkyl group, or an alkyl group having a cyclic structure (cycloalkyl group). In addition, the number of carbon atoms in the above-described alkyl group is preferably 1 to 5.

It is preferable that the group represented by Formula (P1-A) is one unit of a partial structure of poly(meth)acrylic acid ester, which is obtained by polymerization of (meth) acrylic acid ester.

It is preferable that the group represented by Formula (P1-B) is an ethylene glycol unit formed by ring-opening polymerization of an epoxy group of a compound having the epoxy group.

It is preferable that the group represented by Formula (P1-C) is a propylene glycol unit formed by ring-opening polymerization of an oxetane group of a compound having the oxetane group.

It is preferable that the group represented by Formula (P1-D) is a siloxane unit of a polysiloxane obtained by polycondensation of a compound having at least one of an alkoxysilyl group or a silanol group. Here, examples of the compound having at least one of an alkoxysilyl group or a silanol group include a compound having a group represented by Formula $SiR^{14}(OR^{15})_2$—. In the formula, $R^{14}$ has the same definition as that for $R^{14}$ in Formula (P1-D), and a plurality of $R^{15}$'s each independently represent a hydrogen atom or an alkyl group having 1 to 10 carbon atoms.

In Formula (1), L1 represents a single bond or a divalent linking group.

Examples of the divalent linking group represented by L1 include —C(O)O—, —O—, —S—, —C(O)NR$^3$—, —SO$_2$—, and —NR$^3$R$^4$—. In the formulae, $R^3$ and $R^4$ each independently represent a hydrogen atom or an alkyl group having 1 to 6 carbon atoms, which may have a substituent.

In a case where P1 is a group represented by Formula (P1-A), from the viewpoint of further increasing the alignment degree of the dichroic substance, it is preferable that L1 is a group represented by —C(O)O—.

In a case where P1 is a group represented by any one of Formulae (P1-B) to (P1-D), from the viewpoint of further increasing the alignment degree of the dichroic substance, it is preferable that L1 is a single bond.

In Formula (1), from the viewpoint of easily expressing liquid crystallinity and availability of raw materials, it is preferable that the spacer group represented by SP1 has at least one structure selected from the group consisting of an oxyethylene structure, an oxypropylene structure, a polysiloxane structure, and an alkylene fluoride structure.

Here, the oxyethylene structure represented by SP1 is preferably a group represented by *—(CH$_2$—CH$_2$O)$_{n1}$—* is preferable. In the formula, n1 represents an integer of 1 to 20, and * represents a bonding position to L1 or M1 in Formula (1). From the viewpoint of further increasing the alignment degree of the dichroic substance, n1 is preferably an integer of 2 to 10, more preferably an integer of 2 to 4, and still more preferably 3.

In addition, from the viewpoint of further increasing the alignment degree of the dichroic substance, the oxypropylene structure represented by SP1 is preferably a group represented by *—(CH(CH$_3$)—CH$_2$O)$_{n2}$—*. In the formula, n2 represents an integer of 1 to 3, and * represents a bonding position to L1 or M1.

In addition, from the viewpoint of further increasing the alignment degree of the dichroic substance, the polysiloxane structure represented by SP1 is preferably a group represented by *—(Si(CH$_3$)$_2$—O)$_{n3}$—*. In the formula, n3 represents an integer of 6 to 10, and * represents a bonding position to L1 or M1.

In addition, from the viewpoint of further increasing the alignment degree of the dichroic substance, the alkylene fluoride structure represented by SP1 is preferably a group represented by *—(CF$_2$—CF$_2$)$_{n4}$—*. In the formula, n4 represents an integer of 6 to 10, and * represents a bonding position to L1 or M1.

The mesogen group represented by M1 in Formula (1) is a group representing a main skeleton of a liquid crystal molecule which contributes to liquid crystal formation. A liquid crystal molecule exhibits liquid crystallinity which is in an intermediate state (mesophase) between a crystal state and an isotropic liquid state. The mesogen group is not particularly limited, and for example, particularly description on pages 7 to 16 of "Flussige Kristalle in Tabellen II" (VEB Deutsche Verlag fur Grundstoff Industrie, Leipzig, 1984) and particularly description in Chapter 3 of "Liquid Crystal Handbook" (Maruzen, 2000) edited by Liquid Crystal Handbook Editing Committee can be referred to.

As the mesogen group, for example, a group having at least one cyclic structure selected from the group consisting of an aromatic hydrocarbon group, a heterocyclic group, and an alicyclic group is preferable.

From the viewpoint of further increasing the alignment degree of the dichroic substance, the mesogen group preferably has an aromatic hydrocarbon group, more preferably has two to four aromatic hydrocarbon groups, and still more preferably has three aromatic hydrocarbon groups.

As the mesogen group, from the viewpoint of exhibiting the liquid crystallinity, of adjusting the liquid crystal phase transition temperature, of availability of raw materials, and of synthetic suitability, and from the viewpoint of further increasing the alignment degree of the dichroic substance, a group represented by Formula (M1-A) or Formula (M1-B) is preferable, and a group represented by Formula (M1-B) is more preferable.

(M1-A)

(M1-B)

In Formula (M1-A), A1 represents a divalent group selected from the group consisting of an aromatic hydrocarbon group, a heterocyclic group, and an alicyclic group. These groups may be substituted with an alkyl group, a fluorinated alkyl group, an alkoxy group, or a substituent.

It is preferable that the divalent group represented by A1 is a 4- to 6-membered ring. In addition, the divalent group represented by A1 may be a monocyclic ring or a fused ring.

* represents a bonding position to SP1 or T1.

Examples of the divalent aromatic hydrocarbon group represented by A1 include a phenylene group, a naphthylene group, a fluorene-diyl group, an anthracene-diyl group, and a tetracene-diyl group. From the viewpoint of design diversity of the mesogenic skeleton and the availability of raw materials, a phenylene group or a naphthylene group is preferable and a phenylene group is more preferable.

The divalent heterocyclic group represented by A1 may be any of aromatic or non-aromatic, but from the viewpoint of further increasing the alignment degree of the dichroic substance, a divalent aromatic heterocyclic group is preferable.

Examples of atoms other than carbon, constituting the divalent aromatic heterocyclic group, include a nitrogen atom, a sulfur atom, and an oxygen atom. In a case where the aromatic heterocyclic group has a plurality of atoms other than carbon, constituting a ring, these atoms may be the same or different from each other.

Specific examples of the divalent aromatic heterocyclic group include a pyridylene group (pyridine-diyl group), a pyridazine-diyl group, an imidazole-diyl group, a thienylene group (thiophene-diyl group), a quinolylene group (quinoline-diyl group), an isoquinolylene group (isoquinoline-diyl group), an oxazole-diyl group, a thiazole-diyl group, an oxadiazole-diyl group, a benzothiazole-diyl group, a benzothiadiazole-diyl group, a phthalimido-diyl group, a thienothiazole-diyl group, a thiazolothiazole-diyl group, a thienothiophene-diyl group, and a thienooxazole-diyl group.

Specific examples of the divalent alicyclic group represented by A1 include a cyclopentylene group and a cyclohexylene group.

In Formula (M1-A), a1 represents an integer of 1 to 10. In a case where a1 represents 2 or more, a plurality of A1's may be the same or different from each other.

In Formula (M1-B), A2 and A3 each independently represent a divalent group selected from the group consisting of an aromatic hydrocarbon group, a heterocyclic group, and an alicyclic group. Specific examples and suitable aspects of A2 and A3 are the same as those for A1 in Formula (M1-A), and thus the description thereof will not be repeated.

In Formula (M1-B), a2 represents an integer of 1 to 10, and in a case where a2 is 2 or more, a plurality of A2's may be the same or different from each other, a plurality of A3's may be the same or different from each other, and a plurality of LA1's may be the same or different from each other. From the viewpoint of further increasing the alignment degree of the dichroic substance, a2 is preferably an integer of 2 or more and more preferably 2.

In Formula (M1-B), in a case where a2 is 1, LA1 represents a divalent linking group. In a case where a2 is 2 or more, a plurality of LA1's each independently represent a single bond or a divalent linking group, and at least one of the plurality of LA1's is a divalent linking group. In a case where a2 is 2, from the viewpoint of further increasing the alignment degree of the dichroic substance, it is preferable that one of two LA1's is a divalent linking group and the other is a single bond.

In Formula (M1-B), examples of the divalent linking group represented by LA1 include —O—, —(CH$_2$)$_g$—, —(CF$_2$)$_g$—, —Si(CH$_3$)$_2$—, —(Si(CH$_3$)$_2$)$_g$—, —(OSi(CH$_3$)$_2$)$_g$— (g represents an integer of 1 to 10), —N(Z)—, —C(Z)=C(Z')—, —C(Z)=N—, —C(Z)$_2$—C(Z')$_2$—, —C(O)—, —OC(O)—, —O—C(O)O—, —N(Z)C(O)—, —C(Z)=C(Z')—C(O)O—, —C(Z)=N—, —C(Z)=C(Z')—C(O)N(Z")—, —C(Z)=C(Z')—C(O)—S—, —C(Z)=N—N=C(Z')— (Z, Z', and Z" each independently represent a hydrogen atom, a C1 to C4 alkyl group, a cycloalkyl group, an aryl group, a cyano group, or a halogen atom), —N=N—, —S—, —S(O)—, —S(O)(O)—, —(O)S(O)O—, —O(O)S(O)O—, and —SC(O). Among these, from the viewpoint of further increasing the alignment degree of the dichroic substance, —C(O)O— is preferable. LA1 may be a group obtained by combining two or more of these groups.

In Formula (1), examples of the terminal group represented by T1 include a hydrogen atom, a halogen atom, a cyano group, a nitro group, a hydroxy group, an alkyl group having 1 to 10 carbon atoms, an alkoxy group having 1 to 10 carbon atoms, an alkylthio group having 1 to 10 carbon atoms, an alkoxycarbonyloxy group having 1 to 10 carbon atoms, an alkoxycarbonyl group having 1 to 10 carbon atoms (ROC(O)—; R represents an alkyl group), an acyloxy group having 1 to 10 carbon atoms, an acylamino group having 1 to 10 carbon atoms, an alkoxycarbonylamino group having 1 to 10 carbon atoms, a sulfonylamino group having 1 to 10 carbon atoms, a sulfamoyl group having 1 to 10 carbon atoms, a carbamoyl group having 1 to 10 carbon atoms, a sulfinyl group having 1 to 10 carbon atoms, a ureido group having 1 to 10 carbon atoms, and a (meth)acryloyloxy group-containing group. Examples of the above-described (meth)acryloyloxy group-containing group include a group represented by -L-A (L represents a single bond or a linking group; specific examples of the linking group are the same as those for L1 and SP1 described above; and A represents a (meth)acryloyloxy group).

From the viewpoint of further increasing the alignment degree of the dichroic substance, T1 is preferably an alkoxy group having 1 to 10 carbon atoms, more preferably an alkoxy group having 1 to 5 carbon atoms, and still more preferably a methoxy group.

These terminal groups may be further substituted with the groups or polymerizable groups described in JP2010-244038A.

From the viewpoint of further enhancing the adhesiveness of the film to the adjacent layer and improving cohesive force of the film, it is preferable that T1 is a polymerizable group.

The polymerizable group is not particularly limited, and is preferably a polymerizable group capable of radical polymerization or cationic polymerization.

A generally known radically polymerizable group can be used as the radically polymerizable group, and suitable examples thereof include an acryloyl group and a methacryloyl group. In this case, it is known that an acryloyl group generally has a high polymerization rate, and from the viewpoint of improving productivity, an acryloyl group is preferable. However, a methacryloyl group can also be used as the polymerizable group.

A generally known cationically polymerizable group can be used as the cationically polymerizable group, and specific examples thereof include an alicyclic ether group, a cyclic acetal group, a cyclic lactone group, a cyclic thioether group, a spiroorthoester group, and a vinyloxy group. Among these, an alicyclic ether group or a vinyloxy group is suitable, and an epoxy group, an oxetanyl group, or a vinyloxy group is preferable.

From the viewpoint of further increasing the alignment degree of the dichroic substance, a weight-average molecular weight (Mw) of the high-molecular-weight liquid crystal compound having a repeating unit represented by Formula (1) is preferably 1,000 to 500,000 and more preferably 2,000 to 300,000. In a case where the Mw of the high-molecular-weight liquid crystal compound is within the above-described range, the high-molecular-weight liquid crystal compound is easily handled.

In particular, from the viewpoint of suppressing cracking during coating, the weight-average molecular weight (Mw) of the high-molecular-weight liquid crystal compound is preferably 10,000 or more and more preferably 10,000 to 300,000.

In addition, from the viewpoint of temperature latitude of the alignment degree, the weight-average molecular weight (Mw) of the high-molecular-weight liquid crystal compound is preferably less than 10,000 and more preferably 2,000 or more and less than 10,000.

Here, the weight-average molecular weight and the number-average molecular weight in the present invention are values measured by a gel permeation chromatography (GPC) method.

Solvent (eluent): N-methylpyrrolidone
Device name: TOSOH HLC-8220GPC
Column: using three columns of TOSOH TSKgel Super AWM-H (6 mm×15 cm) connected
Column temperature: 25° C.
Sample concentration: 0.1% by mass
Flow rate: 0.35 mL/min
Calibration curve: TSK standard polystyrene (manufactured by TOSOH Corporation), calibration curves of 7 samples with Mw of 2,800,000 to 1,050 (Mw/Mn=1.03 to 1.06) are used The liquid crystal compound is preferably a liquid crystal compound having reverse wavelength dispersibility.

In the present specification, the "having reverse wavelength dispersibility" means that a phase difference film produced using this liquid crystal compound satisfies relationships of Expression (X1) and (X2).

$$Re(450)/Re(550)<1 \tag{X1}$$

$$1<Re(630)/Re(550) \tag{X2}$$

The polymerizable liquid crystal compound having reverse wavelength dispersibility is not particularly limited as long as a film having reverse wavelength dispersibility can be formed, and examples thereof include a compound represented by Formula (I) described in JP2008-297210A (particularly, compounds described in paragraphs [0034] to [0039]), a compound represented by Formula (1) described in JP2010-084032A (particularly, compounds described in paragraphs [0067] to [0073]), a compound represented by General Formula (1) described in JP2019-73496A (particularly compounds described in paragraphs [0017] to [0124]), and a compound represented by Formula (1) described in JP2016-081035A (particularly, compounds described in paragraphs [0043] to [0055]).

From the viewpoint that the effect of the present invention is more excellent, the above-described polymerizable liquid crystal compound is preferably a polymerizable liquid crystal compound having a partial structure represented by Formula (II).

$$*—D^1\text{-Ar-}D^2—* \tag{II}$$

In Formula (II), $D^1$ and $D^2$ each independently represent a single bond, —O—, —CO—, —CO—O—, —C(=S)O—, —CR'R²—, —CR¹R²—CR³R⁴—, —O—CR¹R²—, —CR¹R²—O—CR³R⁴—, —CO—O—CR¹R²—, —O—CO—CR¹R²—, —CR¹R²—CR³R⁴—O—CO—, —CR¹R²—O—CO—CR³R⁴—, —CR¹R²—CO—O—CR³R⁴—, —NR¹—CR²R³—, or —CO—NR¹—.

$R^1$, $R^2$, $R^3$, and $R^4$ each independently represent a hydrogen atom, a fluorine atom, or an alkyl group having 1 to 4 carbon atoms. In a case where there are a plurality of each of $R^1$'s, $R^2$'s, $R^3$'s, and $R^4$'s, the plurality of $R^1$'s, the plurality of $R^2$'s, the plurality of $R^3$'s, and the plurality of $R^4$'s each may be the same or different from each other.

Ar represents any aromatic ring selected from the group consisting of groups represented by Formulae (Ar-1) to (Ar-7). In Formulae (Ar-1) to (Ar-7), * represents a bonding position to $D^1$ or $D^2$, and descriptions of reference numerals in Formulae (Ar-1) to (Ar-7) are the same as those described by Ar in Formula (III), which will be described later.

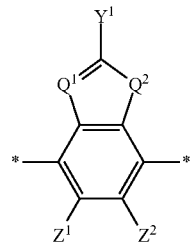

(Ar-1)

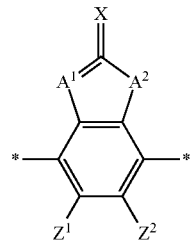

(Ar-2)

(Ar-3)
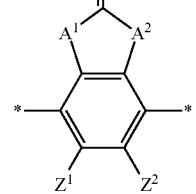

(Ar-4)
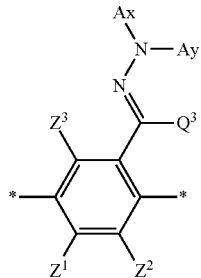

(Ar-5)
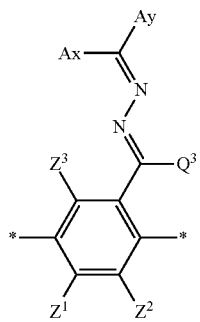

(Ar-6)
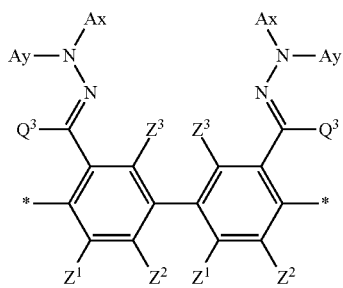

(Ar-7)
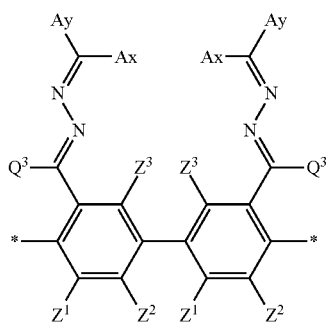

The polymerizable liquid crystal compound having a partial structure represented by Formula (II) is preferably a polymerizable liquid crystal compound represented by Formula (III).

The polymerizable liquid crystal compound represented by Formula (III) is a compound exhibiting liquid crystallinity.

$$L^1\text{-}G^1\text{-}D^1\text{-}Ar\text{-}D^2\text{-}G^2\text{-}L^2 \quad \text{(III)}$$

In Formula (III), $D^1$ and $D^2$ each independently represent a single bond, —O—, —CO—, —CO—O—, —C(=S) O—, —$CR^1R^2$—, —$CR^1R^2$—$CR^3R^4$—, —O—$CR^1R^2$—, —$CR^1R^2$—O—$CR^3R^4$—, —CO—O—$CR^1R^2$—, —O—CO—$CR^1R^2$—, —$CR^1R^2$—$CR^3R^4$—O—CO—, —$CR^1R^2$—O—CO—$CR^3R^4$—, —$CR^1R^2$—CO—O—$CR^3R^4$—, —$NR^1$—$CR^2R^3$—, or —CO—$NR^1$—.

$R^1$, $R^2$, $R^3$, and $R^4$ each independently represent a hydrogen atom, a fluorine atom, or an alkyl group having 1 to 4 carbon atoms. In a case where there are a plurality of each of $R^1$'s, $R^2$'s, $R^3$'s, and $R^4$'s, the plurality of $R^1$'s, the plurality of $R^2$'s, the plurality of $R^3$'s, and the plurality of $R^4$'s each may be the same or different from each other.

$G^1$ and $G^2$ each independently represent a divalent alicyclic hydrocarbon group having 5 to 8 carbon atoms or an aromatic hydrocarbon group, and a methylene group included in the alicyclic hydrocarbon group may be substituted with —O—, —S—, or —NH—.

L1 and $L_2$ each independently represent a monovalent organic group, and at least one selected from the group consisting of L1 and $L_2$ represents a monovalent group having a polymerizable group.

Ar represents any aromatic ring selected from the group consisting of groups represented by Formulae (Ar-1) to (Ar-7). In Formulae (Ar-1) to (Ar-7), * represents a bonding position to $D^1$ or $D^2$.

(Ar-1)
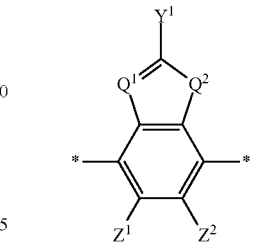

(Ar-2)
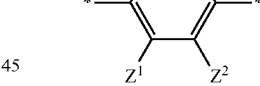

(Ar-3)
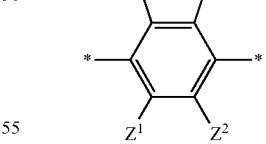
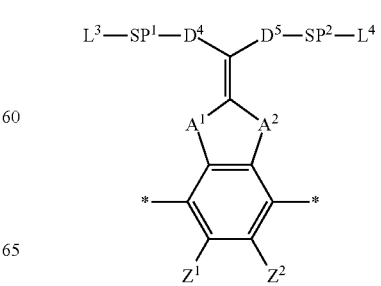

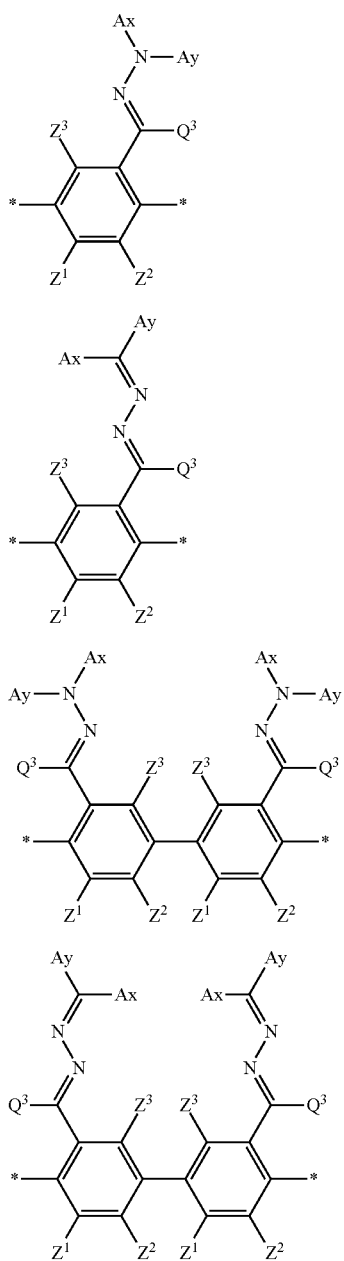

(Ar-4)

(Ar-5)

(Ar-6)

(Ar-7)

In Formula (Ar-1), $Q^1$ represents N or CH, $Q^2$ represents —S—, —O—, or —N($R^7$)—, $R^7$ represents a hydrogen atom or an alkyl group having 1 to 6 carbon atoms, and $Y^1$ represents an aromatic hydrocarbon group having 6 to 12 carbon atoms or an aromatic heterocyclic group having 3 to 12 carbon atoms, each of which may have a substituent.

Examples of the alkyl group having 1 to 6 carbon atoms, represented by $R^7$, include a methyl group, an ethyl group, a propyl group, an isopropyl group, an n-butyl group, an isobutyl group, an sec-butyl group, a tert-butyl group, an n-pentyl group, and a n-hexyl group.

Examples of the aromatic hydrocarbon group having 6 to 12 carbon atoms, represented by $Y^1$, include aryl groups such as a phenyl group, a 2,6-diethylphenyl group, and a naphthyl group.

Examples of the aromatic heterocyclic group having 3 to 12 carbon atoms, represented by $Y^1$, include heteroaryl groups such as a thienyl group, a thiazolyl group, a furyl group, and a pyridyl group.

In addition, examples of the substituent which may be included in $Y^1$ include an alkyl group, an alkoxy group, and a halogen atom.

The alkyl group is preferably an alkyl group having 1 to 18 carbon atoms, more preferably an alkyl group having 1 to 8 carbon atoms (for example, a methyl group, an ethyl group, a propyl group, an isopropyl group, an n-butyl group, an isobutyl group, an sec-butyl group, a t-butyl group, and a cyclohexyl group), still more preferably an alkyl group having 1 to 4 carbon atoms, and particularly preferably a methyl group or an ethyl group. The alkyl group may be any of linear, branched, or cyclic.

As the alkoxy group, for example, an alkoxy group having 1 to 18 carbon atoms is preferable, an alkoxy group having 1 to 8 carbon atoms (for example, a methoxy group, an ethoxy group, an n-butoxy group, and a methoxyethoxy group) is more preferable, an alkoxy group having 1 to 4 carbon atoms is still more preferable, and a methoxy group or an ethoxy group is particularly preferable.

Examples of the halogen atom include a fluorine atom, a chlorine atom, a bromine atom, and an iodine atom, and among these, a fluorine atom or a chlorine atom is preferable.

In addition, in Formulae (Ar-1) to (Ar-7), $Z^1$, $Z^2$, and $Z^3$ each independently represent a hydrogen atom, a monovalent aliphatic hydrocarbon group having 1 to 20 carbon atoms, a monovalent alicyclic hydrocarbon group having 3 to 20 carbon atoms, a monovalent aromatic hydrocarbon group having 6 to 20 carbon atoms, a halogen atom, a cyano group, a nitro group, —$OR^8$, —$NR^9R^{10}$, or —$SR^{11}$, in which $R^8$ to $R^{11}$ each independently represent a hydrogen atom or and an alkyl group having 1 to 6 carbon atoms and $Z^1$ and $Z^2$ may be bonded to each other to form an aromatic ring.

As the monovalent aliphatic hydrocarbon group having 1 to 20 carbon atoms, an alkyl group having 1 to 15 carbon atoms is preferable, an alkyl group having 1 to 8 carbon atoms is more preferable, a methyl group, an ethyl group, an isopropyl group, a tert-pentyl group (1,1-dimethylpropyl group), a tert-butyl group, or a 1,1-dimethyl-3,3-dimethylbutyl group is still more preferable, and a methyl group, an ethyl group, or a tert-butyl group is particularly preferable.

Examples of the monovalent alicyclic hydrocarbon group having 3 to 20 carbon atoms include monocyclic saturated hydrocarbon groups such as a cyclopropyl group, a cyclobutyl group, a cyclopentyl group, a cyclohexyl group, a cycloheptyl group, a cyclooctyl group, a cyclodecyl group, a methylcyclohexyl group, and an ethylcyclohexyl group; monocyclic unsaturated hydrocarbon groups such as a cyclobutenyl group, a cyclopentenyl group, a cyclohexenyl group, a cycloheptenyl group, a cyclooctenyl group, a cyclodecenyl group, a cyclopentadienyl group, a cyclohexadienyl group, a cyclooctadienyl group, and a cyclodecadiene group; and polycyclic saturated hydrocarbon groups such as a bicyclo[2.2.1]heptyl group, a bicyclo[2.2.2]octyl group, a tricyclo[5.2.1.0$^{2,6}$]decyl group, a tricyclo[3.3.1.1$^{3,7}$]decyl group, a tetracyclo[6.2.1.1$^{3,6}$.0$^{2,7}$]dodecyl group, and an adamantyl group.

Examples of the monovalent aromatic hydrocarbon group having 6 to 20 carbon atoms include a phenyl group, a 2,6-diethylphenyl group, a naphthyl group, and a biphenyl group, and an aryl group having 6 to 12 carbon atoms (particularly, a phenyl group) is preferable.

Examples of the halogen atom include a fluorine atom, a chlorine atom, a bromine atom, and an iodine atom, and among these, a fluorine atom, a chlorine atom, or a bromine atom is preferable.

Examples of the alkyl group having 1 to 6 carbon atoms, represented by $R^8$ to $R^{11}$, include a methyl group, an ethyl group, a propyl group, an isopropyl group, an n-butyl group, an isobutyl group, an sec-butyl group, a tert-butyl group, an n-pentyl group, and a n-hexyl group.

In addition, in Formulae (Ar-2) and (Ar-3), $A^1$ and $A^2$ each independently represent a group selected from the group consisting of —O—, —N($R^{12}$)—, —S—, and —CO—, and $R^{12}$ represents a hydrogen atom or a substituent.

Examples of the sub stituent represented by $R^{12}$ include the same substituent which may be included $Y^1$ in Formula (Ar-1) described above.

In addition, in Formula (Ar-2), X represents a hydrogen atom or a non-metal atom of Groups 14 to 16 to which a substituent may be bonded.

In addition, examples of the non-metal atom of Groups 14 to 16, represented by X, include an oxygen atom, a sulfur atom, a nitrogen atom to which a hydrogen atom or a substituent is bonded [=N—$R^{N1}$, $R^{N1}$ represents a hydrogen atom or a substituent], and a carbon atom to which a hydrogen atom or a substituent is bonded [=C—$(R^{C1})_2$, $R^{C1}$ represents a hydrogen atom or a substituent].

Examples of the substituent include an alkyl group, an alkoxy group, an alkyl-substituted alkoxy group, a cyclic alkyl group, an aryl group (for example, a phenyl group, a naphthyl group, and the like), a cyano group, an amino group, a nitro group, an alkylcarbonyl group, a sulfo group, and a hydroxyl group.

In addition, in Formula (Ar-3), $D^4$ and $D^5$ each independently represent a single bond, —CO—, —O—, —S—, —C(=S)—, —$CR^{1a}R^{2a}$—, —$CR^{3a}$=$CR^{4a}$—, —$NR^{5a}$—, or a divalent linking group consisting of a combination of two or more thereof, and $R^{1a}$ to $R^{5a}$ each independently represent a hydrogen atom, a fluorine atom, or an alkyl group having 1 to 4 carbon atoms.

Here, examples of the divalent linking group include —CO—, —O—, —CO—O—, —C(=S)O—, —$CR^{1b}R^{2b}$—, —$CR^{1b}R^{2b}$—$Cr^{1b}R^{2b}$—, —O—$Cr^{1b}R^{2b}$—, —$Cr^{1b}R^{2b}$—O—$Cr^{1b}R^{2b}$—, —CO—O—$Cr^{1b}R^{2b}$—, —O—CO—$CR^{1b}R^{2b}$—, —$CR^{1b}R^{2b}$—O—CO—$CR^{1b}R^{2b}$—, —$CR^{1b}R^{2b}$—CO—O—$CR^{1b}R^{2b}$—, —$NR^{3b}$—$Cr^{1b}R^{2b}$—and —CO—$NR^{3b}$—. $R^{1b}$, $R^{2b}$, and $R^{3b}$ each independently represent a hydrogen atom, a fluorine atom, or an alkyl group having 1 to 4 carbon atoms.

In addition, in Formula (Ar-3), $SP^1$ and $SP^2$ each independently represent a single bond, a linear or branched alkylene group having 1 to 12 carbon atoms, or a divalent linking group in which one or more —$CH_2$—'s constituting a linear or branched alkylene group having 1 to 12 carbon atoms are substituted with —O—, —S—, —NH—, —N(Q)—, or —CO—, in which Q represents a substituent. Examples of the substituent include the same substituent which may be included $Y^1$ in Formula (Ar-1) described above.

Here, the linear or branched alkylene group having 1 to 12 carbon atoms is preferably, for example, a methylene group, an ethylene group, a propylene group, a butylene group, a pentylene group, a hexylene group, a methylhexylene group, or a heptylene group.

In addition, in Formula (Ar-3), $L^3$ and $L^4$ each independently represent a monovalent organic group.

Examples of the monovalent organic group include an alkyl group, an aryl group, and a heteroaryl group. The alkyl group may be linear, branched, or cyclic, but is preferably linear. The number of carbon atoms in the alkyl group is preferably 1 to 30, more preferably 1 to 20, and still more preferably 1 to 10. In addition, the aryl group may be monocyclic or polycyclic, but is preferably monocyclic. The number of carbon atoms in the aryl group is preferably 6 to 25 and more preferably 6 to 10. In addition, the heteroaryl group may be monocyclic or polycyclic. The number of heteroatoms constituting the heteroaryl group is preferably 1 to 3. The heteroatom constituting the heteroaryl group is preferably a nitrogen atom, a sulfur atom, or an oxygen atom. The number of carbon atoms in the heteroaryl group is preferably 6 to 18 and more preferably 6 to 12. In addition, the alkyl group, the aryl group, and the heteroaryl group may be unsubstituted or have a substituent. Examples of the substituent include the same sub stituent which may be included $Y^1$ in Formula (Ar-1) described above.

In addition, in Formulae (Ar-4) to (Ar-7), Ax represents an organic group having 2 to 30 carbon atoms, which has at least one aromatic ring selected from the group consisting of an aromatic hydrocarbon ring and an aromatic heterocyclic ring.

In addition, in Formulae (Ar-4) to (Ar-7), Ay represents a hydrogen atom, an alkyl group having 1 to 12 carbon atoms, which may have a substituent, or an organic group having 2 to 30 carbon atoms which has at least one aromatic ring selected from the group consisting of an aromatic hydrocarbon ring and an aromatic heterocyclic ring.

Here, the aromatic rings in Ax and Ay may have a substituent, and Ax and Ay may be bonded to each other to form a ring.

In addition, Q 3 represents a hydrogen atom or an alkyl group having 1 to 6 carbon atoms, which may have a substituent.

Examples of Ax and Ay include those described in paragraphs to of WO2014/010325A.

In addition, specific examples of the alkyl group having 1 to 6 carbon atoms represented by $Q^3$ include a methyl group, an ethyl group, a propyl group, an isopropyl group, an n-butyl group, an isobutyl group, an sec-butyl group, a tert-butyl group, an n-pentyl group, and an n-hexyl group, and examples of the substituent include the same substituents which may be included in $Y^1$ in Formula (Ar-1).

With regard to the definition and preferred range of each substituent of the liquid crystal compound represented by Formula (III), the descriptions regarding $D^1$, $D^2$, $G^1$, $G^2$, $L^1$, $L^2$, $R^4$, $R^5$, $R^6$, $R^7$, $X^1$, $Y^1$, $Q^1$, and $Q^2$ for Compound (A) described in JP2012-021068A can be referred to for $D_1$, $D_2$, $G_1$, $G_2$, $L_1$, $L_2$, $R^1$, $R^2$, $R^3$, $R^4$, $Q_1$, $Y_1$, $Z_1$, and $Z_2$, respectively; the descriptions regarding $A_1$, $A_2$, and X for the compound represented by General Formula (I) described in JP2008-107767A can be referred to for $A_1$, $A_2$, and X, respectively; and the descriptions regarding Ax, Ay, and $Q^1$ for the compound represented by General Formula (I) described in WO 2013/018526A can be referred to for Ax, Ay, and $Q_2$, respectively. Reference can be made to the description on $Q^1$ for the compound (A) described in JP2012-21068A with regard to $Z_3$.

In particular, the organic groups represented by $L^1$ and $L^2$ are each preferably a group represented by -$D^3$-$G^3$-Sp-$P^3$.

$D^3$ has the same definition as in $D^1$.

$G^3$ represents a single bond, a divalent aromatic ring group having 6 to 12 carbon atoms, a divalent heterocyclic group having 6 to 12 carbon atoms, or a divalent alicyclic hydrocarbon group having 5 to 8 carbon atoms, and a methylene group included in the alicyclic hydrocarbon group may be substituted with —O—, —S—, or NR$^7$—, in which R$^7$ represents a hydrogen atom or an alkyl group having 1 to 6 carbon atoms.

SP represents a single bond or a spacer group represented by —(CH$_2$)$_n$—, —(CH$_2$)$_n$—O—, —(CH$_2$—O—)$_n$—, —(CH$_2$CH$_2$—O—)$_m$—, —O—(CH$_2$)$_n$—, —O—(CH$_2$)$_n$—O—, —O—(CH$_2$CH$_2$—O—)$_m$—, —C(=O)—O—(CH$_2$)$_n$—, —C(=O)—O—(CH$_2$)$_n$—O—, —C(=O)—O—(CH$_2$—O—)$_n$—, —C(=O)—O—(CH$_2$CH$_2$—O—)$_m$—, —C(=O)—N(R$^8$)—(CH$_2$)$_n$—, —C(=O)—N(R$^8$)—(CH$_2$)$_n$—O—, —C(=O)—N(R$^8$)—(CH$_2$—O—)$_n$—, —C(=O)—N(R$^8$)—(CH$_2$CH$_2$—O—)$_m$—, or —(CH$_2$)n—O—(C(=O))—(CH$_2$)$_n$—C(=O)—O—(CH$_2$)$_n$—. Here, n represents an integer of 2 to 12, m represents an integer of 2 to 6, and R$^8$ represents a hydrogen atom or an alkyl group having 1 to 6 carbon atoms. In addition, a hydrogen atom of —CH$_2$— in each group described above may be substituted with a methyl group.

P$^3$ represents a polymerizable group.

The polymerizable group is not particularly limited, and is preferably a polymerizable group capable of radical polymerization or cationic polymerization.

Examples of the radically polymerizable group include known radically polymerizable groups, and an acryloyl group or a methacryloyl group is preferable. It has been known that an acryloyl group generally has a high polymerization rate, and from the viewpoint of improving productivity, an acryloyl group is preferable. However, a methacryloyl group can also be used as the polymerizable group for highly birefringent liquid crystals.

Examples of the cationically polymerizable group include known cationically polymerizable groups, and examples thereof include an alicyclic ether group, a cyclic acetal group, a cyclic lactone group, a cyclic thioether group, a spiroorthoester group, and a vinyloxy group. Among these, an alicyclic ether group or a vinyloxy group is preferable, and an epoxy group, an oxetanyl group, or a vinyloxy group is more preferable.

Particularly preferred examples of the polymerizable group include the following groups.

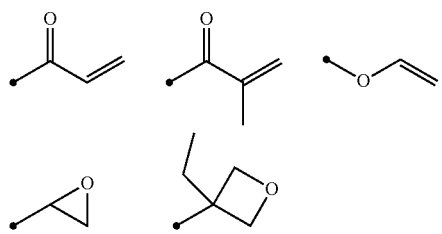

In addition, examples of another preferred aspect of the liquid crystal compound include a compound represented by Formula (V).

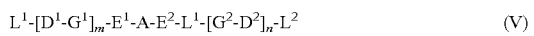

In Formula (V),

A is a non-aromatic carbocyclic group or heterocyclic group having 5 to 8 carbon atoms or an aromatic group or heteroaromatic group having 6 to 20 carbon atoms;

E$^1$, E$^2$, D$^1$, and D$^2$ are each independently a single bond or a divalent linking group;

L$^1$ and L$^2$ are each independently —H, —F, —Cl, —Br, —I, —CN, —NC, —NCO, —OCN, —SCN, —C(=O)NR$^1$R$^2$, —C(=O)R$^1$, —O—C(=O)R$^1$, —NH$_2$, —SH, —SR$^1$, —SO$_3$H, —SO$_2$R$^1$, —OH, —NO$_2$, —CF$_3$, —SF$_3$, substituted or unsubstituted silyl, a substituted or unsubstituted carbyl group or hydrocarb group having 1 to 40 carbon atoms, or —Sp-P, in which at least one of L$^1$ or L$^2$ is —Sp-P, P is a polymerizable group, Sp is a spacer group or a single bond, and R$^1$ and R$^2$ are each independently —H or alkyl having 1 to 12 carbon atoms;

m and n are each independently an integer of 1 to 5, and in a case where m or n is 2 or more, each of the repeating units of -(D$^1$-G$^1$)—'s or -(G$^2$-D$^2$)—'s repeated two or more times may be the same or different from each other; and G$^1$ and G$^2$ are each independently a non-aromatic carbocyclic group or heterocyclic group having 5 to 8 carbon atoms or an aromatic group or heteroaromatic group having 6 to 20 carbon atoms, in which at least one of G$^1$ or G$^2$ is the carbocyclic group or the heterocyclic group, and any one hydrogen atom included in the carbocyclic group or the heterocyclic group is substituted with a group represented by Formula (VI),

in Formula (VI), p is an integer of 1 to 10, and in a case where p is 2 or more, the repeating units of -(Q$^1$)—'s repeated two or more times may be the same or different from each other, Q$^1$'s are each independently a divalent group selected from the group consisting of C≡C, —CY$^1$=CY$^2$—, and a substituted or unsubstituted aromatic group or heteroaromatic group having 6 to 20 carbon atoms, in which Y$^1$ and Y$^2$ are each independently —H, —F, —Cl, —CN, or —R$^1$, B$^1$ is —H, —F, —Cl, —Br, —I, —CN, —NC, —NCO, —OCN, —SCN, —C(=O)NR$^1$R$^2$, —C(=O)R$^1$, —NH$_2$, —SH, —SR$^1$, —SO$_3$H, —SO$_2$R$^1$, —OH, —NO$_2$, —CF$_3$, —SF$_3$, a polymerizable group, an alkenyl group having 2 to 6 carbon atoms, an alkynyl group having 2 to 6 carbon atoms, an acyl group having 2 to 4 carbon atoms, an alkynylene group having 2 to 6 carbon atoms with an acyl group having 2 to 4 carbon atoms bonded to a terminal, an alcohol group having 1 to 5 carbon atoms, or an alkoxy group having 1 to 12 carbon atoms, and R$^1$ and R$^2$ are each independently —H or alkyl having 1 to 12 carbon atoms.

The liquid crystal compound is also preferably a polymerizable liquid crystal compound which has forward wavelength dispersion and has two polymerizable groups P$^1$ and P$^2$ and three or more rings B$^1$ selected from the group consisting of an aromatic ring and an alicyclic ring and existing on a bond connecting the polymerizable groups P$^1$ and P$^2$.

The two polymerizable groups P$^1$ and P$^2$ included in the polymerizable liquid crystal compound may be the same or different from each other, and the three or more rings B$^1$ included in the polymerizable liquid crystal compound are the same or different from each other.

In addition, the polymerizable liquid crystal compound may have forward wavelength dispersion.

In the present specification, the "have reverse wavelength dispersibility" means that a phase difference film produced using this liquid crystal compound satisfies relationships of Expression (Y1) and (Y2).

The polymerizable groups P$^1$ and P$^2$ included in the polymerizable liquid crystal compound are not particularly limited, and are preferably a polymerizable group capable of radical polymerization or cationic polymerization.

A known radically polymerizable group can be used as the radically polymerizable group, and suitable examples thereof include an acryloyloxy group and a methacryloyloxy group. In this case, it has been known that the acryloyloxy group tends to have a higher polymerization rate, and the acryloyloxy group is preferable from the viewpoint of improving productivity, but the methacryloyloxy group can also be used as the polymerizable group.

A known cationically polymerizable group can be used as the cationically polymerizable group, and specific examples thereof include an alicyclic ether group, a cyclic acetal group, a cyclic lactone group, a cyclic thioether group, a spiroorthoester group, and a vinyloxy group.

Among these, an alicyclic ether group or a vinyloxy group is preferable, and an epoxy group, an oxetanyl group, or a vinyloxy group is more preferable.

Examples of particularly preferred polymerizable group include a polymerizable group represented by any one of Formulae (P-1) to (P-20).

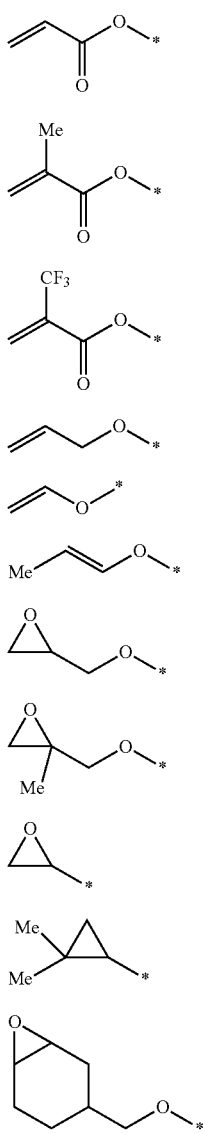

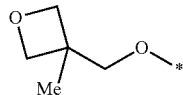

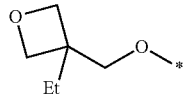

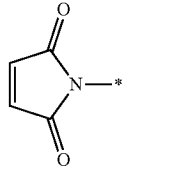

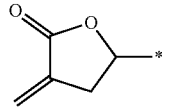

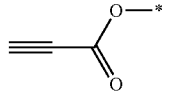

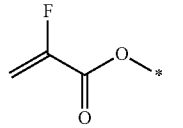

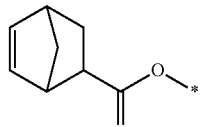

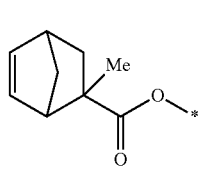

The polymerizable liquid crystal compound may have three or more polymerizable groups. In a case where the polymerizable liquid crystal compound has three or more polymerizable groups, a polymerizable group other than the polymerizable groups $P^1$ and $P^2$ described above is not particularly limited, and examples thereof include the same polymerizable groups as the radically polymerizable or cationically polymerizable groups described above, including suitable aspects thereof.

The number of polymerizable groups in the polymerizable liquid crystal compound is preferably 2 to 4, and it is more preferable to have only two of the polymerizable groups $P^1$ and $P^2$.

The polymerizable liquid crystal compound has three or more rings $B^1$ selected from the group consisting of an aromatic ring which may have a substituent and an alicyclic ring which may have a substituent, the ring $B^1$ existing on a bond connecting the polymerizable groups $P^1$ and $P^2$.

Here, the description that the ring $B^1$ "existing on a bond connecting the polymerizable groups $P^1$ and $P^2$" means that the ring $B^1$ constitutes a part of portion required for directly linking the polymerizable groups $P^1$ and $P^2$.

The polymerizable liquid crystal compound may have a portion other than the portion required for directly linking the polymerizable groups $P^1$ and $P^2$ (hereinafter, also described as "side chain"), and a ring structure forming a part of the side chain is not included in the ring $B^1$.

Examples of the aromatic ring which may have a substituent, which is one aspect of the ring $B^1$, include an aromatic ring having 5 to 20 ring members, which may have a substituent.

Examples of the aromatic ring having 5 to 20 ring members include aromatic hydrocarbon rings such as a benzene ring, a naphthalene ring, an anthracene ring, and a phenanthrene ring; and aromatic heterocyclic rings such as a furan ring, a pyrrole ring, a thiophene ring, a pyridine ring, a thiazole ring, a benzothiazole ring, a quinoline ring, an isoquinoline ring, a quinoxaline ring, and a quinazoline ring.

Examples of the substituent which may be included in the aromatic ring which is one aspect of the ring $B^1$ include an alkyl group, an alkoxy group, an alkylcarbonyl group, an alkoxycarbonyl group, an alkylcarbonyloxy group, an alkylamino group, a dialkylamino group, an alkylamide group, an alkenyl group, an alkynyl group, a halogen atom, a cyano group, a nitro group, an alkylthiol group, and an N-alkyl carbamate group.

Among these, an alkyl group, an alkoxy group, an alkoxycarbonyl group, an alkylcarbonyloxy group, or a halogen atom is preferable.

The alkyl group is preferably a linear, branched, or cyclic alkyl group having 1 to 18 carbon atoms, more preferably an alkyl group having 1 to 8 carbon atoms (for example, a methyl group, an ethyl group, a propyl group, an isopropyl group, an n-butyl group, an isobutyl group, an sec-butyl group, a t-butyl group, a cyclohexyl group, and the like), still more preferably an alkyl group having 1 to 4 carbon atoms, and particularly preferably a methyl group or an ethyl group.

As the alkoxy group, an alkoxy group having 1 to 18 carbon atoms is preferable, an alkoxy group having 1 to 8 carbon atoms (for example, a methoxy group, an ethoxy group, an n-butoxy group, a methoxyethoxy group, and the like) is more preferable, an alkoxy group having 1 to 4 carbon atoms is still more preferable, and a methoxy group or an ethoxy group is particularly preferable.

Examples of the alkoxycarbonyl group include a group in which an oxycarbonyl group (—O—CO— group) is bonded to the alkyl group exemplified above, and for example, a methoxycarbonyl group, an ethoxycarbonyl group, an n-propoxycarbonyl group, or an isopropoxycarbonyl group is preferable, a methoxycarbonyl group is more preferable.

Examples of the alkylcarbonyloxy group include a group in which a carbonyloxy group (—CO—O— group) is bonded to the alkyl group exemplified above, and for example, a methylcarbonyloxy group, an ethylcarbonyloxy group, an n-propylcarbonyloxy group, or an isopropylcarbonyloxy group is preferable, and a methylcarbonyloxy group is more preferable.

Examples of the halogen atom include a fluorine atom, a chlorine atom, a bromine atom, and an iodine atom, and a fluorine atom or a chlorine atom is preferable.

Examples of the alicyclic ring which may have a substituent, which is one aspect of the ring $B^1$, include a divalent alicyclic hydrocarbon group having 5 to 20 carbon atoms, which may have a substituent, and a heterocyclic ring in which one or more —CH$_2$—'s constituting an alicyclic hydrocarbon group having 5 to 20 carbon atoms are substituted with —O—, —S—, or —NH—.

The divalent alicyclic hydrocarbon group having 5 to 20 carbon atoms is preferably a 5-membered ring or a 6-membered ring. In addition, the alicyclic hydrocarbon group may be saturated or unsaturated, but a saturated alicyclic hydrocarbon group is preferable. As the divalent alicyclic hydrocarbon group, for example, the description of paragraph [0078] of JP2012-021068A can be referred to, the contents of which are incorporated herein by reference.

The alicyclic ring which is one aspect of the ring $B^1$ is preferably a cycloalkane ring having 5 to 20 carbon atoms. Examples of the cycloalkane ring having 5 to 20 carbon atoms include a cyclohexane ring, a cyclopeptane ring, a cyclooctane ring, a cyclododecane ring, and a cyclodocosane ring. Among these, a cyclohexane ring is preferable, a 1,4-cyclohexylene group is more preferable, and a trans-1,4-cyclohexylene group is still more preferable.

Examples of the substituent which may be included in the alicyclic ring which is one aspect of the ring $B^1$ include the same substituents as the substituent which may be included in the aromatic ring which is one aspect of the ring $B^1$ described above, including suitable aspects thereof.

The alicyclic ring which is one aspect of the ring $B^1$ preferably has no substituent.

As the ring $B^1$, the polymerizable liquid crystal compound preferably has at least one aromatic ring which may have a substituent, and more preferably has at least one group represented by Formula (III) described later.

In addition, as the ring $B^1$, the polymerizable liquid crystal compound preferably has at least one cyclohexane ring, more preferably has at least one 1,4-cyclohexylene group, and still more preferably has at least one trans-1,4-cyclohexylene group.

That is, as the ring $B^1$, the polymerizable liquid crystal compound preferably has a combination consisting of at least one aromatic ring (more preferably, the group represented by Formula (III) described later) and at least one cyclohexane ring (more preferably, two to four 1,4-cyclohexylene groups).

In the polymerizable liquid crystal compound, the number of rings $B^1$ existing on the bond connecting the polymerizable groups $P^1$ and $P^2$ is not particularly limited, but from the viewpoint of alignment stability of the liquid crystal compound, the number thereof is preferably 3 to 7, more preferably 4 to 6, and still more preferably 5.

From the reason that optical compensation preferably is further improved, the polymerizable liquid crystal compound is preferably a compound represented by Formula (I).

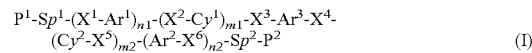

$$P^1\text{-}Sp^1\text{-}(X^1\text{-}Ar^1)_{n1}\text{-}(X^2\text{-}Cy^1)_{m1}\text{-}X^3\text{-}Ar^3\text{-}X^4\text{-}(Cy^2\text{-}X^5)_{m2}\text{-}(Ar^2\text{-}X^6)_{n2}\text{-}Sp^2\text{-}P^2 \quad (I)$$

In Formula (I), $P^1$ and $P^2$ each independently represent a polymerizable group.

$Sp^1$ and $Sp^2$ each independently represent a single bond, a linear or branched alkylene group having 1 to 14 carbon atoms, or a divalent linking group in which one or more —CH$_2$—'s constituting a linear or branched alkylene group having 1 to 14 carbon atoms are substituted with —O—, —S—, —NH—, —N(Q)—, or —CO—, in which Q represents a substituent.

n1, m1, m2, and n2 represent an integer of 0 to 4, and the total of n1, m1, m2, and n2 is 4.

$X^1$, $X^2$, $X^3$, $X^4$, $X^5$, and $X^6$ each independently represent a single bond, —CO—, —O—, —S—, —C(=S)—, —CR$^1$R$^2$—, —CR$^3$=CR$^4$—, —NR$^5$—, or a divalent linking group consisting of a combination of two or more thereof, and R$^1$ to R$^5$ each independently represent a hydrogen atom, a fluorine atom, or an alkyl group having 1 to 12 carbon atoms. However, in a case where n1, m1, m2, or n2 is an integer of 2 to 4, a plurality of $X^1$'s, a plurality of $X^2$'s, a plurality of $X^5$'s, or a plurality of $X^6$'s may be the same or different from each other.

$Ar^1$, $Ar^2$, and $Ar^3$ each independently represent an aromatic ring which may have a substituent. However, in a case where n1 or n2 is an integer of 2 to 4, a plurality of $Ar^1$'s or a plurality of $Ar^2$'s may be the same or different from each other.

$Cy^1$ and $Cy^2$ each independently represent an alicyclic ring which may have a substituent. However, in a case where m1 or m2 is an integer of 2 to 4, a plurality of $Cy^1$'s or a plurality of $Cy^2$'s may be the same or different from each other.

In Formula (I), examples of the polymerizable group represented by $P^1$ and $P^2$ include the same polymerizable groups as the radically polymerizable or cationically polymerizable groups described above. Among these, the polymerizable group represented by any one of Formulae (P-1) to (P-20) described above is preferable, and an acryloyloxy group or a methacryloyloxy group is more preferable.

In Formula (I), examples of the linear or branched alkylene group having 1 to 14 carbon atoms, represented by one aspect of $SP^1$ and $SP^2$, include a methylene group, an ethylene group, a propylene group, a butylene group, a pentylene group, a hexylene group, a methylhexylene group, and a heptylene group. As described above, $SP^1$ and $Sp^2$ may be a divalent linking group in which one or more —$CH_2$—'s constituting these alkylene groups are substituted with —O—, —S—, —NH—, —N(Q)—, or —CO—.

Examples of the substituent represented by Q include the same substituents as the substituent which may be included in the aromatic ring which is one aspect of the ring $B^1$ described above, including suitable aspects thereof.

As $SP^1$ and $SP^2$, a linear or branched alkylene group having 1 to 14 carbon atoms (more preferably having 2 to 10 carbon atoms) or a divalent linking group in which one or more —$CH_2$—'s constituting a linear or branched alkylene group having 2 to 14 carbon atoms (more preferably having 4 to 12 carbon atoms) are substituted with —O— or —CO—.

In Formula (I), the total of n1 and m1 and the total of m2 and n2 are preferably an integer of 1 to 3 and more preferably 2.

Among these, from the viewpoint of improving aligning properties of the polymerizable liquid crystal compound, it is preferable that n1, m1, m2, and n2 are all 1, and from the viewpoint of improving durability, it is preferable that n1 and n2 are all 0 and m1 and m2 are all 2.

In Formula (I), examples of the divalent linking group represented by $X^1$, $X^2$, $X^3$, $X^4$, $X^5$, and $X^6$ include —CO—, —O—, —CO—O—, —C(=S)O—, —$CR^1R^2$—, —$CR^1R^2$—$CR^1R^2$—, —O—$CR^1R^2$—, —$CR^1R^2$—O—$CR^1R^2$—, —CO—O—$CR^1R^2$—, —O—CO—$CR^1R^2$—, —$CR^1R^2$—O—CO—$CR^1R^2$—, —$CR^1R^2$—CO—O—$CR^1R^2$—, —$NR^5$—$CR^1R^2$—, and —CO—$NR^5$—. $R^1$, $R^2$, and $R^5$ each independently represent a hydrogen atom, a fluorine atom, or an alkyl group having 1 to 12 carbon atoms.

$X^1$, $X^2$, $X^3$, $X^4$, $X^5$, and $X^6$ are preferably a single bond, —CO—, —O—, or —COO—.

In Formula (I), examples of the aromatic ring which may have a substituent, represented by $Ar^1$, $Ar^2$, and $Ar^3$, include the same aromatic rings as the aromatic ring which may have a substituent, which is one aspect of the ring $B^1$ described above.

As $Ar_3$ in Formula (I), from the viewpoint of improving the aligning properties of the polymerizable liquid crystal compound, an aromatic ring having 10 or more π electrons is preferable, an aromatic ring having 10 to 18 π electrons is more preferable, and an aromatic ring having 10 to 14 π electrons is still more preferable.

Among these, $Ar_3$ in Formula (I) is preferably a group represented by Formula (III).

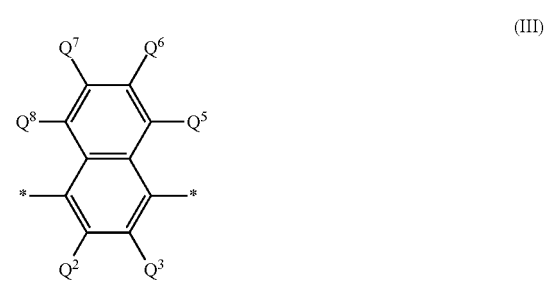

In Formula (III), $Q^2$, $Q^3$, $Q^5$, $Q^6$, $Q^7$, and $Q^8$ each independently represent a hydrogen atom or a substituent. * represents a bonding position.

In Formula (III), it is preferable that all of $Q^2$, $Q^3$, $Q^5$, $Q^6$, $Q^7$, and $Q^8$ are hydrogen atoms or one or two of $Q^2$, $Q^3$, $Q^5$, $Q^6$, $Q^7$, and $Q^8$ represent substituents. Among these, it is more preferable that one or two of $Q^2$, $Q^3$, $Q^5$, $Q^6$, $Q^7$, and $Q^8$ represent substituents and the others represent hydrogen atoms, and it is still more preferable that one thereof represent a substituent and the others represent hydrogen atoms.

In Formula (III), as a group representing the substituent among $Q^2$, $Q^3$, $Q^5$, $Q^6$, $Q^7$, and $Q^8$, any of $Q^5$, $Q^6$, $Q^7$, or $Q^8$ is preferable, it is more preferable that at least one of $Q^5$ or $Q^8$ represents a substituent or at least one of $Q^6$ or $Q^7$ represents a substituent.

In Formula (III), examples of the substituent represented by $Q^2$, $Q^3$, $Q^5$, $Q^6$, $Q^7$, and $Q^8$ include the same substituents as the substituent which may be included in the aromatic ring which is one aspect of the ring $B^1$ described above, including suitable aspects thereof.

Among these, an alkyl group having 1 to 4 carbon atoms, an alkoxy group having 1 to 4 carbon atoms, a group in which an oxycarbonyl group is bonded to an alkyl group having 1 to 4 carbon atoms, a group in which a carbonyloxy group is bonded to an alkyl group having 1 to 4 carbon atoms, a fluorine atom, or a chlorine atom is preferable; and an alkyl group having 1 to 4 carbon atoms, a methoxy group, an ethoxy group, a methoxycarbonyl group, or a m ethyl carb onyl oxy group is more preferable.

In addition, suitable specific examples of Ara in Formula (I) include groups represented by Formulae (IV-1) to (IV-3).

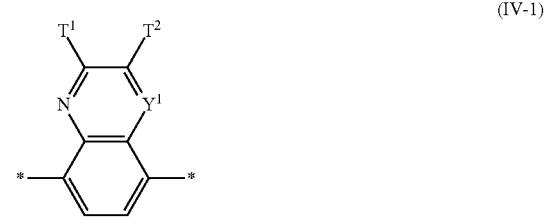

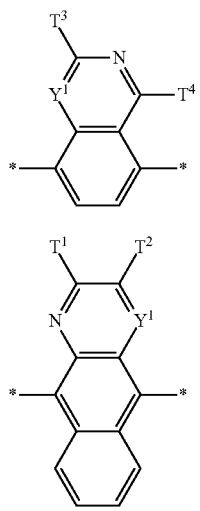 (IV-2)

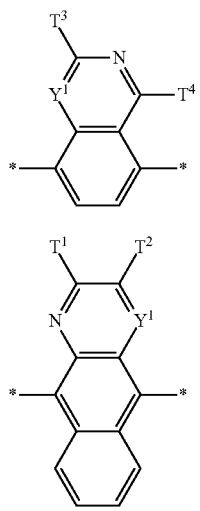 (IV-3)

In Formulae (IV-1) to (IV-3), $Y^1$ represents —C(Ry)═ or —N═, and Ry represents a hydrogen atom, a fluorine atom, a chlorine atom, a trifluoromethyl group, a trifluoromethoxy group, an alkyl group having 1 to 12 carbon atoms, or a phenyl group.

In Formulae (IV-1) to (IV-3), $T^1$, $T^2$, and $T^3$ each independently represent a hydrogen atom, a fluorine atom, a chlorine atom, a trifluoromethyl group, a trifluoromethoxy group, an alkyl group having 1 to 12 carbon atoms, an alkoxy group having 1 to 12 carbon atoms, an alkoxycarbonyl group having 1 to 12 carbon atoms, an alkylcarbonyl group having 1 to 12 carbon atoms, an aromatic ring having 6 to 18 π electrons, or a monovalent organic group in which at least one —$CH_2$—'s in an alkyl group, an alkoxy group, an alkoxycarbonyl group, or an alkylcarbonyl group is substituted with —O—, —CO—, or —S—. In addition, $T^1$ and $T^2$ may be bonded to each other to form a ring.

In Formulae (IV-1) to (IV-3), $T_4$'s each independently represent a hydrogen atom, a fluorine atom, a chlorine atom, a trifluoromethyl group, a trifluoromethoxy group, an alkyl group having 1 to 12 carbon atoms, or a phenyl group. * represents a bonding position.

In Formula (I), $Ar_1$ and $Ar^2$ are preferably an aromatic ring having 6 to 10 π electrons, more preferably an aromatic ring having 6 π electrons, and still more preferably a benzene ring (for example, a 1,4-phenylene group).

In Formula (I), examples of the substituent which may be included in the aromatic ring represented by $Ar_1$ and $Ar^2$ include the same substituents as the substituent which may be included in the aromatic ring which is one aspect of the ring $B^1$ described above, including suitable aspects thereof.

In Formula (I), examples of the alicyclic ring which may have a substituent, represented by $Cy^1$ and $Cy^2$, include the same alicyclic rings as the alicyclic ring which may have a substituent, which is one aspect of the ring $B^1$ described above, including suitable aspects thereof. From the viewpoint that the effect of the present invention is more excellent, a content of the liquid crystal compound is preferably 50% to 99% by mass and more preferably 75% to 90% by mass with respect to the total mass of the light absorption anisotropic film.

(Other components)

The light absorption anisotropic film may contain other components in addition to the components described above.

Examples of the other components include a vertical alignment agent and a leveling agent.

Examples of the vertical alignment agent include a boronic acid compound and an onium salt.

The boronic acid compound is preferably a compound represented by Formula (A).

Formula (A)

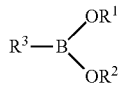

In Formula (A), $R^1$ and $R^2$ each independently represent a hydrogen atom, a substituted or unsubstituted aliphatic hydrocarbon group, a substituted or unsubstituted aryl group, or a substituted or unsubstituted heterocyclic group. $R^3$ represents a substituent including a (meth)acryl group.

Specific examples of the boronic acid compound include a boronic acid compound represented by General Formula (I), described in paragraphs [0023] to [0032] of JP2008-225281A.

The onium salt is preferably a compound represented by Formula (B).

Formula (B)

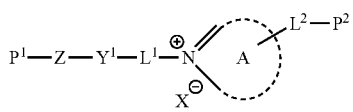

In Formula (B), a ring A represents a quaternary ammonium ion consisting of a nitrogen-containing heterocyclic ring. $X^-$ represents an anion. $L^1$ represents a divalent linking group. $L^2$ represents a single bond or a divalent linking group. $Y^1$ represents a divalent linking group having a 5- or 6-membered ring as a partial structure. Z represents a divalent linking group having an alkylene group having 2 to 20 as a partial structure. $P^1$ and $P^2$ each independently represent a monovalent substituent having a polymerizable ethylenically unsaturated bond.

Specific examples of the onium salt include onium salts described in paragraphs [0052] to [0058] of JP2012-208397A, onium salts described in paragraphs [0024] to [0055] of JP2008-026730A, and onium salts described in JP2002-037777A.

In a case where the light absorption anisotropic film contains a vertical alignment agent, a content of the vertical alignment agent is preferably 0.1% to 400% by mass and more preferably 0.5% to 350% by mass with respect to the total mass of the liquid crystal compound.

The vertical alignment agent may be used alone or in combination of two or more kinds thereof. In a case where two or more kinds of vertical alignment agents are used, the total amount thereof is preferably within the above-described range.

The light absorption anisotropic film may contain a leveling agent. In a case where the composition for forming a light absorption anisotropic film (light absorption anisotropic film) described later contains the leveling agent, surface roughness due to drying air applied to the surface of the light absorption anisotropic film is suppressed, and the dichroic substance is more uniformly aligned.

The leveling agent is not particularly limited, and a leveling agent having a fluorine atom (fluorine-based leveling agent) or a leveling agent having a silicon atom (silicon-based leveling agent) is preferable, and a fluorine-based leveling agent is more preferable.

Examples of the fluorine-based leveling agent include fatty acid esters of polyvalent carboxylic acid, in which a part of a fatty acid is substituted with a fluoroalkyl group, and polyacrylates having a fluoro substituent.

Specific examples of the leveling agent include compounds described in paragraphs [0046] to [0052] of JP2004-331812A and compounds described in paragraphs to of JP2008-257205A.

In a case where the light absorption anisotropic film contains the liquid crystal compound and a leveling agent, a content of the leveling agent is preferably 0.001% to 10% by mass and more preferably 0.01% to 5% by mass with respect to the total mass of the liquid crystal compound.

The leveling agent may be used alone or in combination of two or more kinds thereof. In a case where two or more kinds of leveling agents are used, the total amount thereof is preferably within the above-described range.

(Composition for Forming Light Absorption Anisotropic Film)

It is preferable that the light absorption anisotropic film is formed of a composition for forming a light absorption anisotropic film, which contains a dichroic substance and a liquid crystal compound.

It is preferable that the composition for forming a light absorption anisotropic film contains a solvent described later in addition to the dichroic substance and the liquid crystal compound, and the composition for forming a light absorption anisotropic film may further contain other components described above.

Examples of the dichroic substance contained in the composition for forming a light absorption anisotropic film include the dichroic substance which can be contained in the light absorption anisotropic film.

It is preferable that a content of the dichroic substance with respect to the total solid content mass of the composition for forming a light absorption anisotropic film is the same as the content of the dichroic substance with respect to the total mass of the light ab sorption anisotropic film.

Here, the "total solid content in the composition for forming a light absorption anisotropic film" denotes components excluding a solvent, and specific examples of the solid content include the dichroic substance, the liquid crystal compound, and the above-described other components.

The liquid crystal compound which can be contained in the composition for forming a light absorption anisotropic film and the other components are respectively the same as the liquid crystal compound which can be contained in the light absorption anisotropic film and the other components.

It is preferable that the content of the liquid crystal compound and the content of other components with respect to the total solid content mass of the composition for forming a light absorption anisotropic film are respectively the same as the content of the liquid crystal compound and the content of other components with respect to the total mass of the light absorption anisotropic film.

From the viewpoint of the workability, it is preferable that the composition for forming a light absorption anisotropic film contains a solvent.

Examples of the solvent include organic solvents such as ketones, ethers, aliphatic hydrocarbons, alicyclic hydrocarbons, aromatic hydrocarbons, carbon halides, esters, alcohols, cellosolves, cellosolve acetates, sulfoxides, amides, and heterocyclic compounds, and water.

These solvents may be used alone or in combination of two or more kinds thereof.

Among these solvents, organic solvents are preferable, and carbon halides or ketones are more preferable.

In a case where the composition for forming a light absorption anisotropic film contains a solvent, a content of the solvent is preferably 80% to 99% by mass, more preferably 83% to 97% by mass, and still more preferably 85% to 95% by mass with respect to the total mass of the composition for forming a light absorption anisotropic film.

The composition for forming a light absorption anisotropic film may contain a polymerization initiator.

The polymerization initiator is not particularly limited, but a compound having photosensitivity, that is, a photopolymerization initiator is preferable.

Commercially available products can also be used as such a photopolymerization initiator, and examples thereof include IRGACURE 184, IRGACURE 907, IRGACURE 369, IRGACURE 651, IRGACURE 819, IRGACURE OXE-01, and IRGACURE OXE-02, manufactured by BASF SE.

The polymerization initiator may be used alone or in combination of two or more kinds thereof.

In a case where the composition for forming a light absorption anisotropic film contains a polymerization initiator, a content of the polymerization initiator is preferably 0.01% to 30% by mass and more preferably 0.1% to 15% by mass with respect to the total solid content of the composition for forming a light absorption anisotropic film.

(Manufacturing Method of Light Absorption Anisotropic Film)

A manufacturing method of the light absorption anisotropic film is not particularly limited, but from the viewpoint of further increasing the alignment degree of the dichroic substance, a method (hereinafter, also referred to as "present manufacturing method") including, in the following order, a step of coating an alignment film with a composition for forming a light absorption anisotropic film, which contains the dichroic substance and the liquid crystal compound, to form a coating film (hereinafter, also referred to as "coating film forming step") and a step of aligning a liquid crystal component contained in the coating film (hereinafter, also referred to as "alignment step") is preferable.

The liquid crystal component is a component which includes not only the above-described liquid crystal compound but also a dichroic substance having liquid crystallinity.

Hereinafter, each step will be described.

The coating film forming step is a step of applying the above-described composition for forming a light absorption anisotropic film onto the alignment film to form a coating film.

The composition for forming a light absorption anisotropic film can be easily applied onto the alignment film by using a composition for forming a light absorption anisotropic film, which contains the above-described solvent, or using a liquid such as a melt obtained by heating the composition for forming a light absorption anisotropic film.

Examples of a method of applying the composition for forming a light absorption anisotropic film include known methods such as a roll coating method, a gravure printing method, a spin coating method, a wire bar coating method, an extrusion coating method, a direct gravure coating method, a reverse gravure coating method, a die coating method, a spraying method, and an ink jet method.

The alignment film may be any film as long as the film aligns the liquid crystal component which can be contained in the composition for forming a light absorption anisotropic film.

The alignment film can be provided by methods such as rubbing treatment of an organic compound (preferably a polymer) on a film surface, oblique vapor deposition of an inorganic compound, formation of a layer having microgrooves, or accumulation of an organic compound (for example, w-tricosanoic acid, dioctadecylmethylammonium chloride, or methyl stearate) by the Langmuir-Blodgett method (LB film). Furthermore, an alignment film in which an alignment function is generated by application of an electric field, application of a magnetic field, or irradiation with light has also been known. Among these, in the present invention, an alignment film formed by performing a rubbing treatment is preferable from the viewpoint of easily controlling a pretilt angle of the alignment film, and a photo-alignment film formed by irradiation with light is also preferable from the viewpoint of the uniformity of alignment.

As the photo-alignment film, a photo-alignment film containing an azobenzene coloring agent, polyvinyl cinnamate, or the like is used.

The dichroic substance in the light absorption anisotropic film can be aligned by irradiating a photo-alignment layer with ultraviolet rays in an oblique direction with respect to the normal direction of the photo-alignment layer, generating anisotropy with an inclination with respect to the normal direction of the photo-alignment layer, and aligning the light absorption anisotropic film thereon.

In addition, a liquid crystal layer in which the liquid crystal compound is hybrid-aligned can also be used as the alignment film.

The alignment step is a step of aligning a liquid crystal component (particularly, the dichroic substance) contained in the coating film. In the alignment step, the dichroic substance is considered to be aligned along the liquid crystal compound aligned by the alignment film.

The alignment step may include a drying treatment. Components such as a solvent can be removed from the coating film by performing the drying treatment. The drying treatment may be performed by a method of allowing the coating film to stand at room temperature for a predetermined time (for example, natural drying) or a method of heating the coating film and/or blowing air to the coating film.

It is preferable that the alignment step includes a heat treatment. As a result, the dichroic substance contained in the coating film is further aligned, and the alignment degree of the dichroic substance is further increased.

From the viewpoint of manufacturing suitability, a heat temperature is preferably 10° C. to 250° C. and more preferably 25° C. to 190° C. In addition, the heating time is preferably 1 to 300 seconds and more preferably 1 to 60 seconds.

The alignment step may include a cooling treatment performed after the heat treatment. The cooling treatment is a treatment of cooling the heated coating film to room temperature (20° C. to 25° C.). As a result, the alignment of the dichroic substance contained in the coating film is further fixed, and the alignment degree of the dichroic substance is further increased. A cooling unit is not particularly limited, and the cooling treatment can be performed according to a known method.

The light absorption anisotropic film according to the embodiment of the present invention can be obtained by performing the above-described steps.

The present manufacturing method may include a step of curing the light absorption anisotropic film after the above-described alignment step (hereinafter, also referred to as "curing step"). That is, the light absorption anisotropic film may contain a cured substance of the above-described composition.

The curing step is performed by, for example, heating the film and/or irradiating (exposing) the film with light. Among these, it is preferable that the curing step is performed by irradiating the light absorption anisotropic film with light.

Various light sources such as infrared rays, visible light, and ultraviolet rays can be used as a light source for curing, but ultraviolet rays are preferable. In addition, ultraviolet rays may be applied while the layer is heated during curing, or ultraviolet rays may be applied through a filter which transmits only a specific wavelength.

In addition, the exposure may be performed under a nitrogen atmosphere. In a case where the curing of the light absorption anisotropic film proceeds by radical polymerization, since inhibition of polymerization by oxygen is reduced, it is preferable that the exposure is performed in a nitrogen atmosphere.

Optical Film

The light absorption anisotropic film according to the embodiment of the present invention may be combined with another phase difference film.

Examples of an embodiment of the optical film according to the present invention include an aspect including the above-described light absorption anisotropic film and a C-plate.

There are two types of C-plates, a positive C-plate (C-plate which is positive) and a negative C-plate (C-plate which is negative). The positive C-plate satisfies a relationship of Expression (C1) and the negative C-plate satisfies a relationship of Expression (C2). The positive C-plate has an Rth showing a negative value and the negative C-plate has an Rth showing a positive value.

Expression(C1) $nz > nx \approx ny$

Expression(C2) $nz < nx \approx ny$

The symbol "≈" encompasses not only a case where both sides are completely the same as each other but also a case where the both sides are substantially the same as each other. The expression "substantially the same" means that, for example, a case where (nx−ny)×d (in which d is a thickness of a film) is 0 to 10 nm and preferably 0 to 5 nm is also included in "nx≈ny".

An absolute value of a thickness direction retardation of the C-plate at a wavelength of 550 nm is not particularly limited, but from the viewpoint that the effect of the present invention is more excellent, it is preferably 300 to 800 nm and more preferably 400 to 700 nm.

An absolute value of a thickness direction retardation of the C-plate at a wavelength of 650 nm is not particularly limited, but from the viewpoint that the effect of the present invention is more excellent, it is preferably 300 to 950 nm and more preferably 350 to 800 nm.

A material constituting the C-plate is not particularly limited, and the C-plate may be a layer formed of a liquid crystal compound or a resin film.

Examples of another embodiment of the optical film according to the present invention include an aspect including the above-described light absorption anisotropic film and a B-plate.

The B-plate is either a positive B-plate or a negative B-plate.

The positive B-plate satisfies a relationship of Expression (B1) and the negative B-plate satisfies a relationship of Expression (B2), assuming that a refractive index in a film in-plane slow axis direction (in a direction in which an in-plane refractive index is maximum) is defined as nx, a refractive index in an in-plane direction orthogonal to the in-plane slow axis is defined as ny, and a refractive index in a thickness direction is defined as nz.

Expression(B1) $nz>nx>ny$

Expression(B2) $nx>ny>nz$

The positive B-plate has a negative value of the thickness direction retardation, and the negative B-plate has a positive value of the thickness direction retardation.

An in-plane retardation of the B-plate at a wavelength of 550 nm is not particularly limited, but from the viewpoint that the effect of the present invention is more excellent, it is preferably 100 to 200 nm and more preferably 110 to 170 nm.

An absolute value of a thickness direction retardation of the B-plate at a wavelength of 550 nm is not particularly limited, but from the viewpoint that the effect of the present invention is more excellent, it is preferably 300 to 500 nm and more preferably 350 to 450 nm.

A material constituting the B-plate is not particularly limited, and the B-plate may be a layer formed of a liquid crystal compound or a resin film.

The optical film according to the embodiment of the present invention may include the above-described light absorption anisotropic film, the C-plate, and the B-plate.

The optical film according to the embodiment of the present invention may include a support.

The type of the support is not particularly limited, and a known support can be used. In particular, a transparent support is preferable. The transparent support is intended to be a support in which the transmittance of visible light is 60% or more, and the transmittance is preferably 80% or more and more preferably 90% or more.

Examples of the support include a glass substrate and a resin substrate, and a glass substrate is preferable.

Application

The light absorption anisotropic film according to the embodiment of the present invention and the optical film according to the embodiment of the present invention can be applied to various applications.

For example, the light absorption anisotropic film according to the embodiment of the present invention and the optical film according to the embodiment of the present invention can be applied to an image display device. More specifically, the image display device according to the embodiment of the present invention includes an image display element and the light absorption anisotropic film according to the embodiment of the present invention or the optical film according to the embodiment of the present invention, which is disposed on the image display element.

Examples of the image display element include a liquid crystal display element and an organic electroluminescence display element.

In a case where the optical film disposed on the image display element includes the light absorption anisotropic film and the C-plate, it is preferable that the C-plate is disposed on the viewing side.

In a case where the optical film disposed on the image display element includes the light absorption anisotropic film and the B-plate, it is preferable that the light absorption anisotropic film is disposed on the viewing side.

In a case where the image display element is an organic electroluminescence display element, an antireflection film including a polarizer and a λ/4 plate may be disposed between the image display element and the optical film according to the embodiment of the present invention. In a case where the antireflection film is used, the polarizer is disposed on the viewing side.

EXAMPLES

Hereinafter, features of the present invention will be described in more detail with reference to Examples and Comparative Examples. The materials, amounts used, proportions, treatment details, treatment procedure, and the like shown in the following Examples can be appropriately changed without departing from the spirit and scope of the present invention. Accordingly, the scope of the present invention should not be construed as being limited by the specific examples given below.

Example 1

(Production of Alignment Layer)

A surface of a cellulose acylate film (TAC base material; manufactured by FUJIFILM Corporation, TG40) with a thickness of 40 μm was saponified with an alkaline solution, and coated with the following composition for forming an alignment film using a wire bar.

The support on which the coating film had been formed was dried with hot air at 60° C. for 60 seconds and further dried with hot air at 100° C. for 120 seconds to form an alignment film, thereby obtaining a TAC film with an alignment film.

A film thickness of the alignment film was 1 μm.

| Composition for forming alignment film | |
|---|---|
| Modified polyvinyl alcohol PVA-1 | 3.80 parts by mass |
| IRGACURE 2959 | 0.20 parts by mass |
| Water | 70 parts by mass |
| Methanol | 30 parts by mass |

Modified polyvinyl alcohol PVA-1

$-(CH_2-CH)_{96.8}(CH_2-CH)_{1.5}(CH_2-CH)_{1.7}\ \ CH_3$
　　　　|　　　　　　　|　　　　　　　　|　　　　　　|
　　　　OH　　　　OCOCH$_3$　　OCONHCH$_2$CH$_2$OCOC=CH$_2$ (Production of Light Absorption Anisotropic Film)

Next, the obtained alignment film was continuously coated with the following composition P1 for forming a light absorption anisotropic film using a wire bar, heated at 120° C. for 60 seconds, and cooled to room temperature (23° C.).

Next, the coating film was heated at 70° C. for 60 seconds and cooled to room temperature again.

Thereafter, the coating film was irradiated with ultraviolet rays from an LED lamp (central wavelength: 365 nm) for 2 seconds under an irradiation condition of an illuminance of 200 mW/cm$^2$, thereby forming a light absorption anisotropic film on the alignment film.

A film thickness of the light absorption anisotropic film was 4 μm.

Formulation of composition P1 for forming light absorption anisotropic film

| | |
|---|---|
| Dichroic substance D-1 | 0.63 parts by mass |
| Dichroic substance D-2 | 0.17 parts by mass |
| Dichroic substance D-3 | 0.28 parts by mass |
| Dichroic substance D-4 | 0.85 parts by mass |
| High-molecular-weight liquid crystal compound P-1 | 4.93 parts by mass |
| Rod-like liquid crystal compound 1 | 3.25 parts by mass |
| IRGACURE OXE-02 (manufactured by BASF SE) | 0.16 parts by mass |
| Compound E-1 | 0.12 parts by mass |
| Compound E-2 | 0.12 parts by mass |
| Surfactant F-1 | 0.004 parts by mass |
| Cyclopentanone | 80.53 parts by mass |
| Benzyl alcohol | 8.95 parts by mass |

Dichroic substance D-1

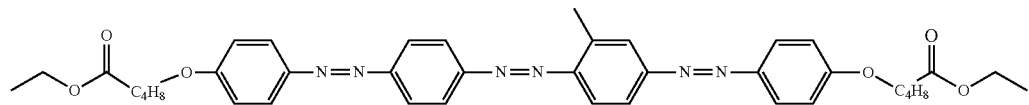

Dichroic substance D-2

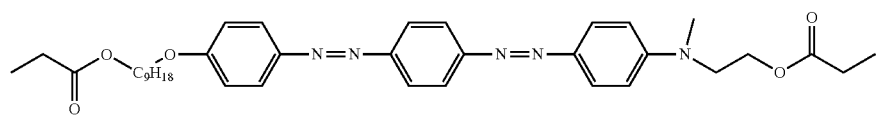

Dichroic substance D-3

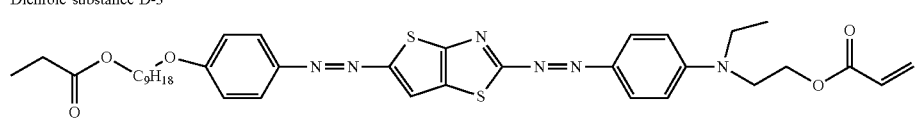

Dichroic substance D-4

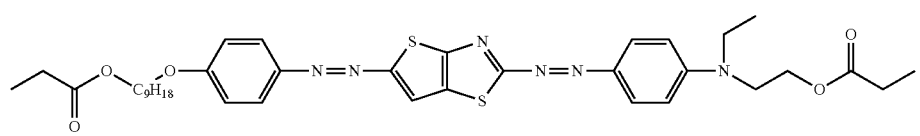

High-molecular-weight liquid crystal compound P-1

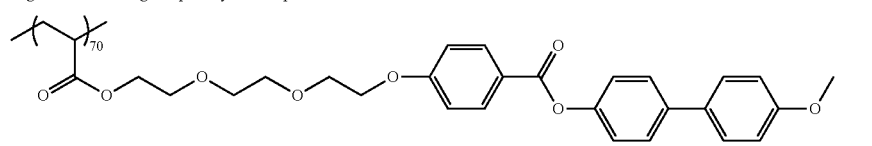

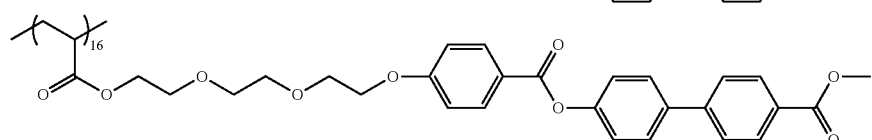

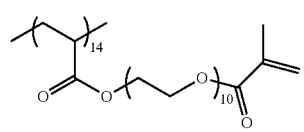

Rod-like liquid crystal compound 1

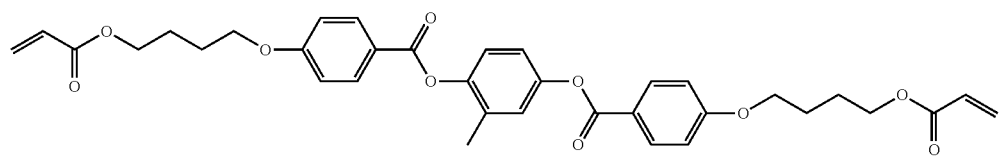 [SMILES: C=CC(=O)OCCCCOc1ccc(C(=O)Oc2ccc(OC(=O)c3ccc(OCCCCOC(=O)C=C)cc3)c(C)c2)cc1]

Compound E-1

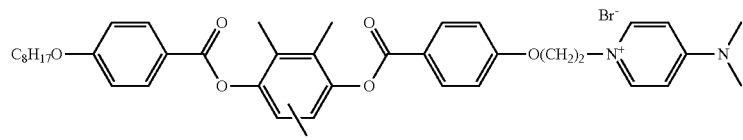

Compound E-2

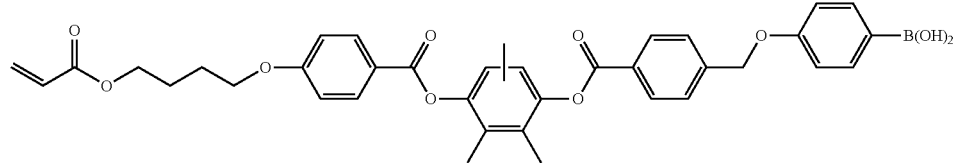

Surfactant F-1

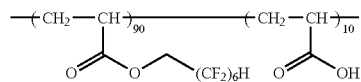

Using AxoScan OPMF-1 (manufactured by Opto Science, Inc.), a direction of a transmittance central axis was measured by measuring the transmittance of the produced light absorption anisotropic film 1 while changing the polar angle and the azimuthal angle.

As a result, the transmittance central axis of the light absorption anisotropic film 1 was perpendicular to the main surface of the film.

In a case where the average polarization degree A of the produced light absorption anisotropic film 1 was measured using AxoScan OP1V1F-1 (manufactured by Opto Science, Inc.), the average polarization degree A was 0.85.

In addition, a retardation at a wavelength of 650 nm in the direction tilted by 50° with respect to the normal direction of the main surface of the light absorption anisotropic film 1 was 240 nm.

In addition, a retardation at a wavelength of 550 nm in the direction tilted by 50° with respect to the normal direction of the main surface of the light absorption anisotropic film 1 was 260 nm.

In addition, in a case where a polarization degree was measured by allowing light having a wavelength of 450 to 750 nm to be incident from the direction tilted by 50° with respect to the normal direction of the main surface of the light absorption anisotropic film 1 and a wavelength showing a maximal value of the polarization degree on a longest wavelength side was defined as Pmax, Pmax was a wavelength of 600 nm.

(Production of Protective Layer)

A coating film was formed by continuously coating the obtained light absorption anisotropic film 1 with the following composition for forming a protective layer using a wire bar.

Next, the laminate on which the coating film had been formed was dried with hot air at 60° C. for 60 seconds, and further dried with hot air at 100° C. for 120 seconds to form a protective layer, thereby obtaining a light absorption anisotropic film P1.

A film thickness of the protective layer was 0.5 μm.

| Composition for forming protective layer | |
| --- | --- |
| Modified polyvinyl alcohol PVA-1 shown above | 3.80 parts by mass |
| IRGACURE 2959 | 0.20 parts by mass |
| Coloring agent compound G-1 | 0.08 parts by mass |
| Water | 70 parts by mass |
| Methanol | 30 parts by mass |

Coloring agent compound G-1

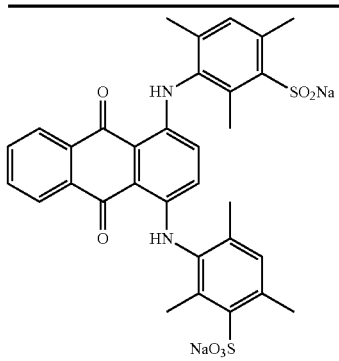

(Production of B-Plate)

A cycloolefin resin ARTON G7810 (manufactured by JSR Corporation) was dried at 100° C. for 2 hours or more, and melt-extruded at 280° C. using a twin screw kneading extruder. Here, a screen filter, a gear pump, and a leaf disc filter were arranged in this order between the extruder and a die, these were connected by a melt pipe, and the resultant was extruded from a T die having a width of 1000 mm and a lip gap of 1 mm and was cast on a triple cast roll in which temperatures were set to 180° C., 175° C., and 170° C., thereby obtaining an unstretched film 1 having a width of 900 mm and a thickness of 320 μm.

The unstretched film 1 transported was subjected to a stretching step and a thermal fixing step by the following method.

(a) Machine-directional stretching

The unstretched film 1 was machine-directionally stretched under the following conditions while being transported using an inter-roll machine-direction stretching machine having an aspect ratio (L/W) of 0.2.

Preheating temperature: 170° C., stretching temperature: 170° C., and stretching ratio: 155%

(b) Cross-direction stretching

The machine-directionally stretched film was cross-directionally stretched under the following conditions while being transported using a tenter.

Preheating temperature: 170° C., stretching temperature: 170° C., stretching ratio: 80%

After the stretching step, the stretched film was subjected to a heat treatment under the following conditions while end portions of the stretched film were gripped with a tenter clip to hold both end portions of the stretched film such that the width thereof was constant (within 3% of expansion or contraction), and the stretched film was thermally fixed.

Thermal fixation temperature: 165° C., thermal fixation time: 30 seconds

The preheating temperature, the stretching temperature, and the thermal fixation temperature are average values of values measured at five points in the width direction using a radiation thermometer.

After the thermal fixation, both ends of the stretched film were trimmed and wound at a tension of 25 kg/m, thereby obtaining a film roll having a width of 1340 mm and a winding length of 2000 m. The obtained stretched film had an in-plane retardation of 160 nm at a wavelength of 550 nm, a thickness direction retardation of 390 nm at a wavelength of 550 nm, an Nz coefficient of 2.9, a slow axis in the MD direction, and a film thickness of 80 μm. The obtained film was set as a B-plate.

(Production of Laminate A1)

A polarizing plate 1 in which a thickness of a polarizer was 8 μm and one surface of the polarizer was exposed was produced by the same method as that for a polarizing plate 02 with a one-surface protective film, described in WO2015/166991A. The surface of the above-described polarizing plate 1 in which the polarizer was exposed and the surface of the B-plate produced above were subjected to a corona treatment, and both surfaces were bonded to each other using the following PVA adhesive 1. At this time, the surfaces adhered to each other by determining a direction such that the machine-direction stretching direction of the B-plate and the absorption axis of the polarizer were parallel to each other. Next, the surface of the B-plate and the surface of the produced light absorption anisotropic film P1 on the protective layer side were subjected to a corona treatment on the back side of the B-plate adhered to the polarizer, and both surfaces were bonded to each other using the following PVA adhesive 1, thereby obtaining a laminate A1. At this time, the angle between the plane including the transmittance central axis of the light absorption anisotropic film and the normal line of the film surface, and the absorption axis of the polarizer was 90°.

(Preparation of PVA Adhesive 1)

20 parts of methylol melamine with respect to 100 parts of a polyvinyl alcohol-based resin containing an acetoacetyl group (average degree of polymerization: 1200, degree of saponification: 98.5% by mole, degree of acetoacetylation: 5% by mole) was dissolved in pure water under a temperature condition of 30° C. to prepare an aqueous solution in which the concentration of solid contents was adjusted to 3.7%.

(Production of Image Display Device B1)

A GALAXY S4 (manufactured by SAMSUNG Electronics Co., Ltd.) equipped with an organic EL panel (organic EL display element) was disassembled, a touch panel with a circularly polarizing plate was peeled off from an organic EL display device, the circularly polarizing plate was further peeled off from the touch panel, the organic EL display element, the touch panel, and the circularly polarizing plate were isolated from each other, and the isolated circularly polarizing plate was re-bonded to the organic EL display element. Furthermore, the laminate A1 was laminated on the re-bonded circularly polarizing plate using a commercially available pressure sensitive adhesive (Soken Chemical & Engineering Co., Ltd., SK2057). In this case, the lamination was carried out such that the transmission axis of the polarizer in the circularly polarizing plate and the transmission axis of the polarizer in the laminate A1 were parallel to each other. In this manner, an image display device B1 was produced. In the image display device $B^1$, the light absorption anisotropic film was disposed on the viewing side with respect to the B-plate.

(Production of Image Evaluation Device and Evaluation of Reflected Image)

Figure 8:
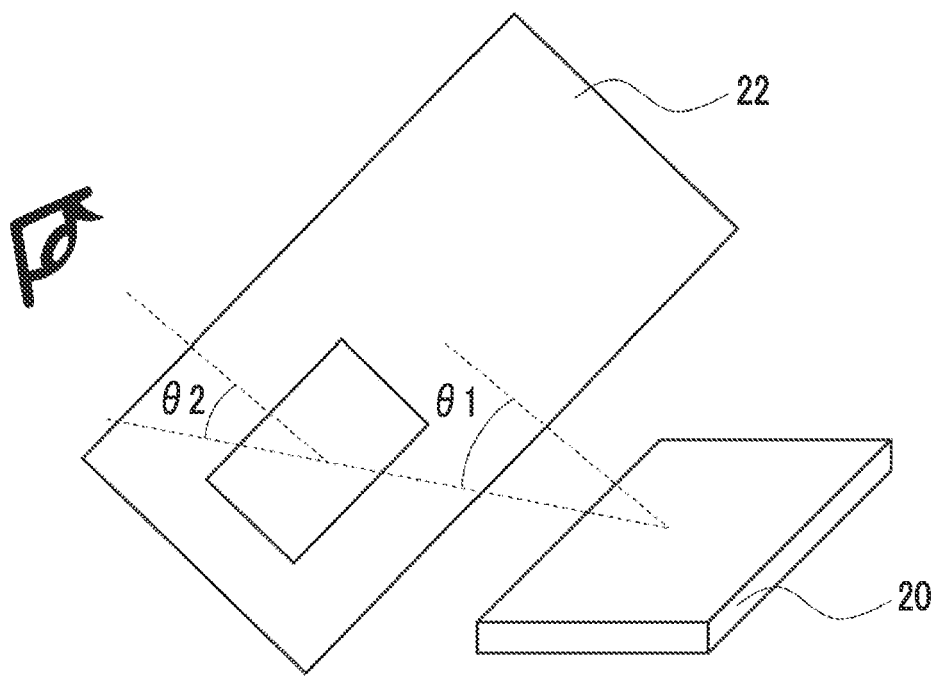
FIG. 8 is a perspective view illustrating an image evaluation device.
Figure 9:
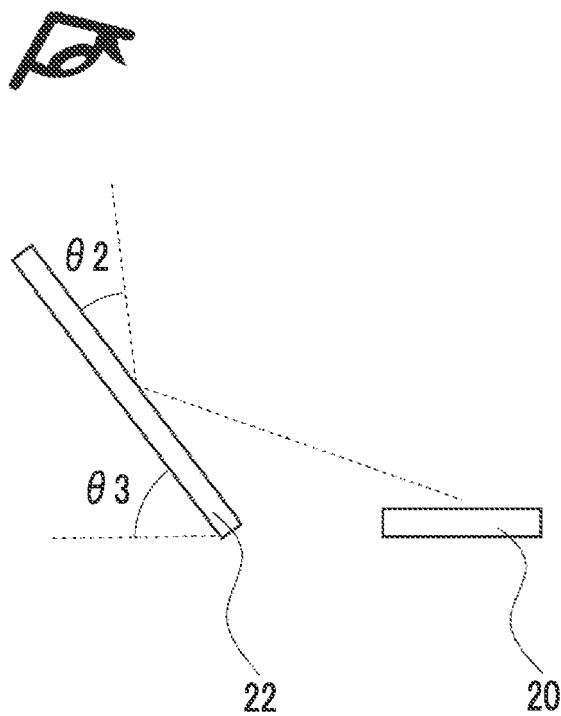
FIG. 9 is a side view illustrating the image evaluation device.

In order to evaluate a reflected image on an acrylic plate, a reflected glare image evaluation device shown in FIGS. 8 and 9 was produced using the produced image display device B1.

In a state where white images (R256, G256, and B256) were displayed on the entire surface of the image display device B1 (20), hues of the images reflected on the surface of an acrylic plate 22 were subjected to sensory evaluation, and tints (redness, greenness, and blueness) and brightness were evaluated.

At this time, the direction of observing the reflected images was set to an oblique direction at an angle (θ1) of approximately 30° with respect to a straight line extending from the center of the image display device B1 (20) to the front direction of the acrylic plate 22 as shown in FIGS. 8 and 9, and the reflected images were observed from obliquely above at an angle (θ2) of approximately 20° with respect to the plane of the acrylic plate 22.

The acrylic plate 22 was tilted by 45° with respect to the surface of the image display device B1 (20). That is, an angle θ3 was 45°.

AA: tint of the image was not felt, and the reflected glare was not noticeable.

A: tint of the image was substantially neutral, and the image was almost noticeable.

B: image had a green tint, and the image was slightly noticeable, which was within an allowable range.

C: tint of the image was strong redness and was out of an allowable range.

D: reflected image of the image was bright and was out of an allowable range.

Example 2

An image display device B2 was produced and evaluated in the same manner as in Example 1, except that, in the production of Example 1, the following composition P2 for forming a light absorption anisotropic film was continuously applied using a wire bar instead of the composition P1 for forming a light absorption anisotropic film, heated at 120° C. for 60 seconds, cooled to room temperature (23° C.), heated at 80° C. for 60 seconds, and cooled again to room temperature.

| Formulation of composition P2 for forming light absorption anisotropic film | |
|---|---|
| Dichroic substance D-1 | 0.63 parts by mass |
| Dichroic substance D-2 | 0.17 parts by mass |
| Dichroic substance D-4 | 1.13 parts by mass |
| High-molecular-weight liquid crystal compound P-1 | 4.93 parts by mass |
| Rod-like liquid crystal compound 1 | 3.25 parts by mass |
| IRGACURE OXE-02 (manufactured by BASF SE) | 0.16 parts by mass |
| Compound E-1 | 0.12 parts by mass |
| Compound E-2 | 0.12 parts by mass |
| Surfactant F-1 | 0.004 parts by mass |
| Cyclopentanone | 80.53 parts by mass |
| Benzyl alcohol | 8.95 parts by mass |

Example 3

A light absorption anisotropic film was produced in the same manner as in Example 1, except that, in the production of Example 1, the composition P1 for forming a light absorption anisotropic film was continuously applied using a wire bar, heated at 120° C. for 60 seconds, cooled to room temperature (23° C.), heated at 80° C. for 60 seconds, and cooled again to room temperature. During the application, the coating amount was adjusted so that the film thickness of the light absorption anisotropic film was 3.5 μm. Subsequently, an image display device B3 was produced and evaluated in the same manner as in Example 1.

Example 4

A light absorption anisotropic film was produced in the same manner as in Example 1, except that, in the production of Example 1, the composition P1 for forming a light absorption anisotropic film was continuously applied using a wire bar, heated at 120° C. for 60 seconds, cooled to room temperature (23° C.), heated at 85° C. for 60 seconds, and cooled again to room temperature. During the application, the coating amount was adjusted so that the film thickness of the light absorption anisotropic film was 5 μm. Subsequently, an image display device B4 was produced and evaluated in the same manner as in Example 1.

Example 5

A light absorption anisotropic film was produced in the same manner as in Example 1, except that, in the production of Example 1, the following composition P3 for forming a light absorption anisotropic film was continuously applied using a wire bar instead of the composition P1 for forming a light absorption anisotropic film, heated at 120° C. for 60 seconds, cooled to room temperature (23° C.), heated at 85° C. for 60 seconds, and cooled again to room temperature. During the application, the coating amount was adjusted so that the film thickness of the light absorption anisotropic film was 2 μm. Subsequently, an image display device B5 was produced and evaluated in the same manner as in Example 1.

| Formulation of composition P3 for forming light absorption anisotropic film | |
|---|---|
| Dichroic substance D-1 | 0.88 parts by mass |
| Dichroic substance D-2 | 0.11 parts by mass |
| Dichroic substance D-3 | 1.13 parts by mass |
| High-molecular-weight liquid crystal compound P-1 | 1.77 parts by mass |
| Rod-like liquid crystal compound 1 | 1.17 parts by mass |
| IRGACURE OXE-02 (manufactured by BASF SE) | 0.08 parts by mass |
| Compound E-1 | 0.06 parts by mass |
| Compound E-2 | 0.06 parts by mass |
| Surfactant F-1 | 0.002 parts by mass |
| Cyclopentanone | 87.64 parts by mass |
| Benzyl alcohol | 7.11 parts by mass |

Example 6

An image display device B6 was produced and evaluated in the same manner as in Example 2, except that, in the production of Example 2, an optical film Q1 corresponding to the negative C-plate below was laminated to the protective film side of the polarizing plate with a one-surface protective film using a commercially available pressure sensitive adhesive (Soken Chemical & Engineering Co., Ltd., SK2057).

(Production of Optical Film Q1)

The following composition for forming a negative C-plate was prepared, and a uniform solution was obtained.

| Composition for forming negative C-plate | |
|---|---|
| Discotic liquid crystal compound CA-1 | 80 parts by mass |
| Discotic liquid crystal compound CA-2 | 20 parts by mass |
| Discotic liquid crystal compound DB-1 | 5.6 parts by mass |
| Polymerizable monomer CS1 | 5.6 parts by mass |
| Polymer CC-1 | 0.2 parts by mass |
| Polymerization initiator (IRGACURE 907, manufactured by BASF SE) | 3 parts by mass |
| Toluene | 170 parts by mass |
| Methyl ethyl ketone | 73 parts by mass |

Discotic liquid crystal compound CA-1 (1,3,5-substituted benzene type polymerizable discotic liquid crystal compound)

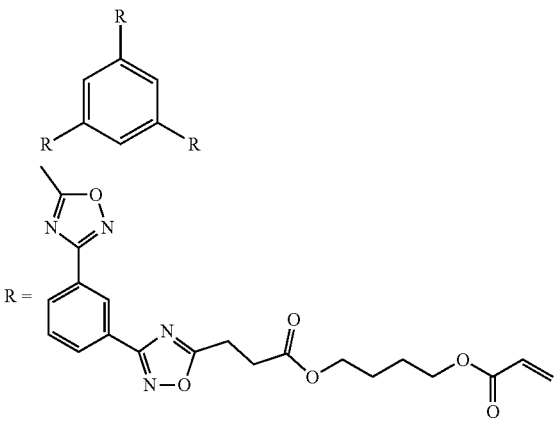

Discotic liquid crystal compound CA-2 (1,3,5-substituted benzene type polymerizable discotic liquid crystal compound)

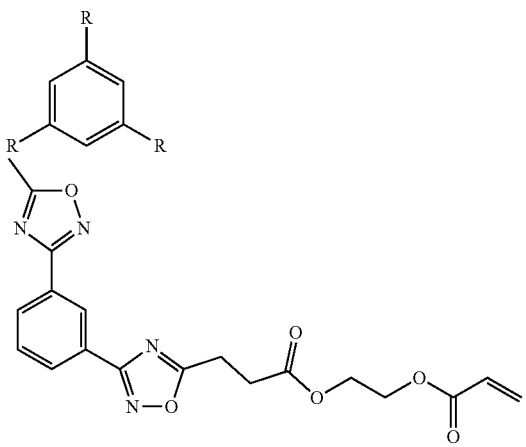

Discotic liquid crystal compound CB-1 (polymerizable triphenylene type discotic liquid crystal compound)

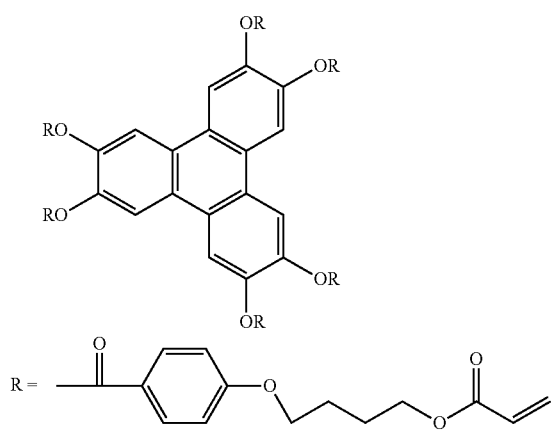

Polymerizable monomer CS1

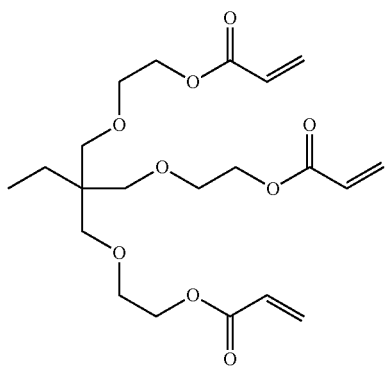 [SMILES: C=CC(=O)OCCOCC(CC)(COCCOC(=O)C=C)COCCOC(=O)C=C]

Polymer CC-1 (hereinafter, the copolymerization ratio of the chemical structural formula is in units of % by mass)

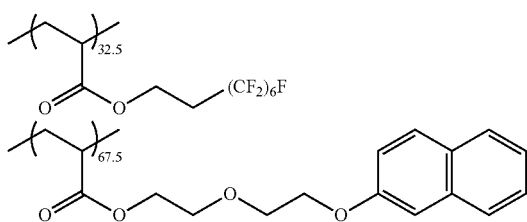

A commercially available cellulose triacetate film (FUJITAC ZRD40, manufactured by FUJIFILM Corporation) was used as a support without being subjected to a saponification treatment. The surface of the support was coated with the above-described composition for forming a negative C-plate, the solvent was dried in a step of continuously heating the coating layer from room temperature to 100° C., and the coating layer was further heated in a drying zone at 100° C. for approximately 90 seconds, cooled to 60° C., and exposed to UV rays at 300 mJ/cm$^2$ in the atmosphere, thereby obtaining an optical film Q1 including a negative C-plate. In a case where the alignment state was observed after the coating layer was allowed to be naturally cooled to room temperature, it was found that the discotic liquid crystal compound was horizontally aligned without any defects. The negative C-plate had a thickness direction retardation of 400 nm at a wavelength of 550 nm and an in-plane retardation of 1 nm at a wavelength of 550 nm. In addition, the negative C-plate had a thickness direction retardation of 390 nm at a wavelength of 650 nm and an in-plane retardation of 1 nm at a wavelength of 650 nm.

Example 7

A light absorption anisotropic film was produced in the same manner as in Example 1, except that, in the production of Example 1, the following composition P4 for forming a light absorption anisotropic film was continuously applied using a wire bar instead of the composition P1 for forming a light absorption anisotropic film, heated at 120° C. for 60 seconds, cooled to room temperature (23° C.), heated at 85° C. for 60 seconds, and cooled again to room temperature. During the application, the coating amount was adjusted so that the film thickness of the light absorption anisotropic film was 3 μm. Subsequently, an image display device B7 was produced and evaluated in the same manner as in Example 6, except that an optical film Q1 corresponding to the negative C-plate below was laminated to the protective film side of the polarizing plate with a one-surface protective film using a commercially available pressure sensitive adhesive (Soken Chemical & Engineering Co., Ltd., SK2057).

| Formulation of composition P4 for forming light absorption anisotropic film ||
|---|---|
| Dichroic substance D-1 | 0.88 parts by mass |
| Dichroic substance D-2 | 0.11 parts by mass |
| Dichroic substance D-3 | 1.13 parts by mass |
| High-molecular-weight liquid crystal compound P-1 | 3.06 parts by mass |
| Rod-like liquid crystal compound 1 | 1.56 parts by mass |
| IRGACURE OXE-02 (manufactured by BASF SE) | 0.11 parts by mass |
| Compound E-1 | 0.08 parts by mass |
| Compound E-2 | 0.08 parts by mass |
| Surfactant F-1 | 0.003 parts by mass |
| Cyclopentanone | 86.01 parts by mass |
| Benzyl alcohol | 6.97 parts by mass |

Comparative Example 1

A light absorption anisotropic film was produced in the same manner as in Example 1, except that, in the production of Example 1, the following composition P5 for forming a light absorption anisotropic film was continuously applied using a wire bar instead of the composition P1 for forming a light absorption anisotropic film, heated at 120° C. for 60 seconds, cooled to room temperature (23° C.), heated at 85° C. for 60 seconds, and cooled again to room temperature. During the application, the coating amount was adjusted so that the film thickness of the light absorption anisotropic film was 3.5 μm. Subsequently, an image display device B8 was produced and evaluated in the same manner as in Example 1.

| Formulation of composition P5 for forming light absorption anisotropic film ||
|---|---|
| Dichroic substance D-1 | 0.63 parts by mass |
| Dichroic substance D-2 | 0.17 parts by mass |
| Dichroic substance D-3 | 1.13 parts by mass |
| High-molecular-weight liquid crystal compound P-1 | 4.93 parts by mass |
| Rod-like liquid crystal compound 1 | 3.25 parts by mass |

-continued

| Formulation of composition P5 for forming light absorption anisotropic film | |
|---|---|
| IRGACURE OXE-02 (manufactured by BASF SE) | 0.16 parts by mass |
| Compound E-1 | 0.12 parts by mass |
| Compound E-2 | 0.12 parts by mass |
| Surfactant F-1 | 0.004 parts by mass |
| Cyclopentanone | 80.53 parts by mass |
| Benzyl alcohol | 8.95 parts by mass |

Comparative Example 2

An image display device B9 was produced and evaluated in the same manner as in Comparative Example 1, except that, in the production of Comparative Example 1, the coating amount of the composition P5 for forming a light absorption anisotropic film was adjusted so that the film thickness of the light absorption anisotropic film was 2 μm.

In Table 1, the column of "650 nm" in the column of "Retardation" indicates a retardation (nm) at a wavelength of 650 nm in the direction tilted by 50° with respect to the normal direction of the main surface of the light absorption anisotropic film.

In Table 1, the column of "550 nm" in the column of "Retardation" indicates a retardation (nm) at a wavelength of 550 nm in the direction tilted by 50° with respect to the normal direction of the main surface of the light absorption anisotropic film.

In Table 1, the column of "Maximal wavelength of polarization degree" indicates a wavelength (nm) showing the maximal value of polarization degree on the longest wavelength side in a case where a polarization degree was measured by allowing light having a wavelength of 450 to 750 nm to be incident from the direction tilted by 50° with respect to the normal direction of the main surface of the light absorption anisotropic film.

The transmittance central axis of the light absorption anisotropic film obtained in each of Examples was perpendicular to the main surface of the film.

From the comparison of Example 1 and Example 5, it was confirmed that, in a case where the content of the dichroic substance was 30% by mass or more with respect to the total content of the liquid crystal compound and the dichroic substance, the effect was more excellent.

From the comparison between Example 2 and Example 6, it was confirmed that, in a case where the C-plate was used, the effect was more excellent.

EXPLANATION OF REFERENCES 10A, 10B: light absorption anisotropic film
20: image display device
22: acrylic plate
100: image display element
102: light absorption anisotropic film in related art
104: image display device
106: windshield

What is claimed is:
1. A light absorption anisotropic film formed of a composition containing a liquid crystal compound and a dichroic substance,
wherein the light absorption anisotropic film has two main surfaces facing each other,
an angle between a normal direction of a main surface of the light absorption anisotropic film and a transmittance central axis of the light absorption anisotropic film is 0° to 45°,
in a case where the angle is 0°, the following requirement A1 is satisfied, and
in a case where the angle is other than 0°, the following requirement B1 is satisfied,
the requirement A1: an average polarization degree A of a polarization degree which is measured by allowing light having a wavelength of 450 nm to be incident from a direction tilted by 50° with respect to the normal direction, a polarization degree which is measured by allowing light having a wavelength of 550 nm to be incident from the direction tilted by 50° with respect to the normal direction, and a polarization degree which is

TABLE 1

| | Example 1 | Example 2 | Example 3 | Example 4 | Example 5 | Example 6 | Example 7 | Comparative Example 1 | Comparative Example 2 |
|---|---|---|---|---|---|---|---|---|---|
| Average polarization degree | 0.85 | 0.85 | 0.80 | 0.95 | 0.85 | 0.85 | 0.85 | 0.9 | 0.70 |
| Retardation 650 nm | 240 nm | 230 nm | 240 nm | 240 nm | 200 nm | 230 nm | 225 nm | 330 nm | 160 nm |
| 550 nm | 260 nm | 140 nm | 230 nm | 230 nm | 80 nm | 140 nm | 120 nm | 160 nm | 60 nm |
| Maximal wavelength of polarization degree | 600 nm | 600 nm | 630 nm | 630 nm | 580 nm | 600 nm | 580 nm | 580 nm | 580 nm |
| Proportion of dichroic substance with respect to content of dichroic substance and liquid crystal compound (% by mass) | 19% | 19% | 19% | 19% | 42% | 19% | 31% | 19% | 19% |
| Presence or absence of C-plate | Absence | Absence | Absence | Absence | Absence | Presence | Presence | Absence | Absence |
| Evaluation of reflected glare | B | A | B | A | AA | AA | AA | C | D |

As shown in Table 1, the light absorption anisotropic film according to the embodiment of the present invention exhibited a desired effect.

Among these, from the comparison of Example 1 and Example 2, it was confirmed that, in a case where the requirement A2 was satisfied, the effect was more excellent.

In comparison of Example 1 and Example 3, the average polarization degree was not 0.85 or more in Example 3, so that the original effect was slightly deteriorated, but since the requirement A3 was satisfied, the evaluation result was the same as that of Example 1.

measured by allowing light having a wavelength of 650 nm to be incident from the direction tilted by 50° with respect to the normal direction is 0.80 or more, and
a retardation at a wavelength of 650 nm in the direction tilted by 50° with respect to the normal direction is less than 250 nm,
the requirement B1: an average polarization degree B of a polarization degree which is measured by allowing light having a wavelength of 450 nm to be incident from a direction tilted by 50° on a normal direction side with respect to the transmittance central axis, a polarization degree which is measured by allowing light having a wavelength of 550 nm to be incident from the direction tilted by 50° on the normal direction side with respect to the transmittance central axis, and a polarization degree which is measured by allowing light having a wavelength of 650 nm to be incident from the direction tilted by 50° on the normal direction side with respect to the transmittance central axis is 0.80 or more, and a retardation at a wavelength of 650 nm in the direction tilted by 50° on the normal direction side with respect to the transmittance central axis is less than 250 nm, the polarization degree is a value represented by the following expression, $$\text{Polarization degree} = \sqrt{\frac{(TyO - TzO)}{(TyO + TzO)}}$$

in the expression, Ty0 is a transmittance with respect to polarized light in a direction orthogonal to a direction obtained by orthographically projecting the transmittance central axis onto a plane orthogonal to a direction in which the light is incident, and Tz0 is a transmittance with respect to polarized light in a direction parallel to the direction obtained by orthographically projecting the transmittance central axis onto the plane orthogonal to the direction in which the light is incident.

2. The light absorption anisotropic film according to claim 1,
wherein, in a case where the angle is 0°, the following requirement A2 is satisfied, and
in a case where the angle is other than 0°, the following requirement B2 is satisfied,
the requirement A2: a retardation at a wavelength of 550 nm in the direction tilted by 50° with respect to the normal direction is less than 220 nm,
the requirement B2: a retardation at a wavelength of 550 nm in the direction tilted by 50° on the normal direction side with respect to the transmittance central axis is less than 220 nm.

3. The light absorption anisotropic film according to claim 2,
wherein, in a case where the angle is 0°, the following requirement A3 is satisfied, and
in a case where the angle is other than 0°, the following requirement B3 is satisfied,
the requirement A3: in a case where a polarization degree is measured by allowing light having a wavelength of 450 to 750 nm to be incident from the direction tilted by 50° with respect to the normal direction and a wavelength showing a maximal value of the polarization degree on a longest wavelength side is defined as Pmax, Pmax is a wavelength of more than 610 nm,
the requirement B3: in a case where a polarization degree is measured by allowing light having a wavelength of 450 to 750 nm to be incident from the direction tilted by 50° on the normal direction side with respect to the transmittance central axis and a wavelength showing a maximal value of the polarization degree on a longest wavelength side is defined as Pmax, Pmax is a wavelength of more than 610 nm.

4. The light absorption anisotropic film according to claim 2,
wherein, in a case where the angle is 0°, the following requirement A4 is satisfied, and
in a case where the angle is other than 0°, the following requirement B4 is satisfied,
the requirement A4: the average polarization degree A is more than 0.90,
the requirement B4: the average polarization degree B is more than 0.90.

5. The light absorption anisotropic film according to claim 2,
wherein a content of the dichroic substance is 30% by mass or more with respect to a total content of the liquid crystal compound and the dichroic substance.

6. An optical film comprising:
the light absorption anisotropic film according to claim 2; and
a C-plate.

7. An optical film comprising:
the light absorption anisotropic film according to claim 2; and
a B-plate.

8. An image display device comprising:
the light absorption anisotropic film according to claim 2.

9. The light absorption anisotropic film according to claim 1,
wherein, in a case where the angle is 0°, the following requirement A3 is satisfied, and
in a case where the angle is other than 0°, the following requirement B3 is satisfied,
the requirement A3: in a case where a polarization degree is measured by allowing light having a wavelength of 450 to 750 nm to be incident from the direction tilted by 50° with respect to the normal direction and a wavelength showing a maximal value of the polarization degree on a longest wavelength side is defined as Pmax, Pmax is a wavelength of more than 610 nm,
the requirement B3: in a case where a polarization degree is measured by allowing light having a wavelength of 450 to 750 nm to be incident from the direction tilted by 50° on the normal direction side with respect to the transmittance central axis and a wavelength showing a maximal value of the polarization degree on a longest wavelength side is defined as Pmax, Pmax is a wavelength of more than 610 nm.

10. The light absorption anisotropic film according to claim 9,
wherein, in a case where the angle is 0°, the following requirement A4 is satisfied, and
in a case where the angle is other than 0°, the following requirement B4 is satisfied,
the requirement A4: the average polarization degree A is more than 0.90,
the requirement B4: the average polarization degree B is more than 0.90.

11. The light absorption anisotropic film according to claim 9,
wherein a content of the dichroic substance is 30% by mass or more with respect to a total content of the liquid crystal compound and the dichroic substance.

12. An optical film comprising:
the light absorption anisotropic film according to claim 9; and
a C-plate.

13. An optical film comprising:
the light absorption anisotropic film according to claim 9; and
a B-plate.

14. The light absorption anisotropic film according to claim 1,
- wherein, in a case where the angle is 0°, the following requirement A4 is satisfied, and
- in a case where the angle is other than 0°, the following requirement B4 is satisfied,
- the requirement A4: the average polarization degree A is more than 0.90,
- the requirement B4: the average polarization degree B is more than 0.90.

15. The light absorption anisotropic film according to claim 1,
- wherein a content of the dichroic substance is 30% by mass or more with respect to a total content of the liquid crystal compound and the dichroic substance.

16. An optical film comprising:
the light absorption anisotropic film according to claim 1; and
a C-plate.

17. An image display device comprising:
the optical film according to claim 16.

18. An optical film comprising:
the light absorption anisotropic film according to claim 1; and
a B-plate.

19. An image display device comprising:
the optical film according to claim 18.

20. An image display device comprising:
the light absorption anisotropic film according to claim 1.

\* \* \* \* \*